United States Patent
Takahashi et al.

(10) Patent No.: US 10,412,303 B2
(45) Date of Patent: Sep. 10, 2019

(54) IMAGING DEVICE, STARTUP METHOD OF IMAGING DEVICE, AND COMPUTER READABLE RECORDING MEDIUM

(71) Applicant: Olympus Corporation, Hachioji-shi, Tokyo (JP)

(72) Inventors: Yoshiteru Takahashi, Musashino (JP); Atsushi Takahashi, Hino (JP)

(73) Assignee: Olympus Corporation, Tokyo (JP)

( * ) Notice: Subject to any disclaimer, the term of this patent is extended or adjusted under 35 U.S.C. 154(b) by 59 days.

(21) Appl. No.: 15/636,493

(22) Filed: Jun. 28, 2017

(65) Prior Publication Data
US 2018/0027182 A1 Jan. 25, 2018

(30) Foreign Application Priority Data

Jul. 21, 2016 (JP) ................................. 2016-143769
Jul. 21, 2016 (JP) ................................. 2016-143770
Mar. 8, 2017 (JP) ................................. 2017-044337

(51) Int. Cl.
*H04N 5/232* (2006.01)
*G03B 17/00* (2006.01)
*G03B 5/02* (2006.01)

(52) U.S. Cl.
CPC ......... *H04N 5/23241* (2013.01); *G03B 17/00* (2013.01); *H04N 5/23287* (2013.01); *H04N 5/23293* (2013.01); *H04N 5/232935* (2018.08); *H04N 5/232939* (2018.08); *G03B 5/02* (2013.01); *G03B 2205/0038* (2013.01); *G03B 2205/0069* (2013.01); *G03B 2217/007* (2013.01)

(58) Field of Classification Search
CPC .......... H04N 5/23241; H04N 5/23287; H04N 5/23293; H04N 5/232935; H04N 5/232939; H04N 5/232941
See application file for complete search history.

(56) References Cited

U.S. PATENT DOCUMENTS

| | | | |
|---|---|---|---|
| 7,900,035 B2 * | 3/2011 | Yoshida ................ | G06F 15/177 713/1 |
| 2004/0169743 A1 * | 9/2004 | Hosoda ............... | G06F 9/44505 348/231.6 |
| 2004/0170421 A1 * | 9/2004 | Yoshizawa ............ | G06F 9/4411 396/310 |

(Continued)

FOREIGN PATENT DOCUMENTS

JP 4196696 10/2008

*Primary Examiner* — Daniel M Pasiewicz
(74) *Attorney, Agent, or Firm* — John C. Pokotylo; Pokotylo Patent Services

(57) ABSTRACT

An imaging device includes: an imaging control unit configured to enable an imaging unit to operate after first predetermined time from stating of power supply to the imaging unit; a display control unit configured to control a display unit to display image data generated by the imaging unit after second predetermined time from starting of power supply to the display unit, the second predetermined time being longer than the first predetermined time; and a display image data generating unit configured to generate image data from when the display control unit controls the display unit to display the image data to when transition to a capturable state completes, to sequentially reduce or magnify an image formed based on the image data, and to control the display unit to display the reduced or magnified image.

9 Claims, 16 Drawing Sheets

(56) References Cited

U.S. PATENT DOCUMENTS

| | | | |
|---|---|---|---|
| 2009/0167897 A1* | 7/2009 | Fujita | H04N 5/232 |
| | | | 348/240.1 |
| 2013/0107062 A1* | 5/2013 | Okazaki | H04N 5/23203 |
| | | | 348/207.1 |

* cited by examiner

IMAGING DEVICE, STARTUP METHOD OF IMAGING DEVICE, AND COMPUTER READABLE RECORDING MEDIUM

CROSS-REFERENCE TO RELATED APPLICATIONS

This application is based upon and claims the benefit of priority from Japanese Patent Application Nos. 2016-143769 and 2016-143770 filed on Jul. 21, 2016 and Japanese Patent Application No. 2017-44337 filed on Mar. 8, 2017, the entire contents of which are incorporated herein by reference.

BACKGROUND

The present disclosure relates to an imaging device, a startup method of an imaging device, and a computer readable recording medium.

In an imaging device which images a subject and generates image data of the subject, an initialization operation of hardware and software is performed at the time of a start where a power source is applied. In general, a capturable state is obtained after the initialization operation is complete, but when the initialization operation takes time, there is a case where a decisive scene is missed when a user plans to start imaging immediately after the power source is applied. For this reason, a reduction in the initialization operation is one problem of the imaging device.

In such a circumference, a technology is disclosed in which an initialization operation of an imaging device including a retractable optical system is shortened (for example, refer to Japanese Patent No. 4196696). In such a technology, in the case of the imaging device including the retractable optical system, display preparation of a live view image is performed while the optical system is moved, by considering that time required for feeding the optical system in the initialization operation occupies a large proportion.

SUMMARY

An imaging device according to one aspect of the preset disclosure starts power supply to an imaging unit and a display unit in response to input of a power source, and performs startup process for transition to a capturable state, and includes: an imaging control unit configured to enable the imaging unit to operate after first predetermined time from the stating of the power supply to the imaging unit; a display control unit configured to control the display unit to display image data generated by the imaging unit after second predetermined time from the starting of the power supply to the display unit, the second predetermined time being longer than the first predetermined time; and a display image data generating unit configured to generate image data from when the display control unit controls the display unit to display the image data to when the transition to the capturable state completes, to sequentially reduce or magnify an image formed based on the image data, and to control the display unit to display the reduced or magnified image.

A startup method according to one aspect of the present disclosure of an imaging device which starts power supply to an imaging unit and a display unit in response to input of a power source, and performs startup process for transition to a capturable state includes: enabling the imaging unit to operate after first predetermined time from the starting of the power supply to the imaging unit; controlling the display unit to display image data generated by the imaging unit after second predetermined time from the starting of the power supply to the display unit, the second predetermined time being longer than the first predetermined time; and generating image data from when the display unit is controlled to display the image data to when the transition to the capturable state completes, sequentially reducing or magnifying an image formed based on the image data, and controlling the display unit to display the reduced or magnified image.

A non-transitory computer-readable recording medium according to the present disclosure stores an executable program causing a processor to execute: enabling an imaging unit to operate after first predetermined time from starting of power supply to the imaging unit; controlling a display unit to display image data generated by the imaging unit after second predetermined time from starting of power supply to the display unit, the second predetermined time being longer than the first predetermined time; and generating image data from when the display unit is controlled to display the image data to when transition to a capturable state completes, sequentially reducing or magnifying an image formed based on the image data, and controlling the display unit to display the reduced or magnified image.

The above and other features, advantages and technical and industrial significance of this disclosure will be better understood by reading the following detailed description of presently preferred embodiments of the disclosure, when considered in connection with the accompanying drawings.

DETAILED DESCRIPTION

Hereinafter, an aspect for carrying out the present disclosure (hereinafter, referred to as an "embodiment") will be described with reference to the attached drawings. An imaging device of the embodiment of the present disclosure starts power supply to an imaging unit and a display unit in response to the input of a power source, and performs a startup process for transition to a capturable state, the imaging device includes an imaging control unit enabling the imaging unit to be operated after first predetermined time from the power supply to the imaging unit is started, a display control unit allowing image data generated by the imaging unit to be displayed on the display unit after second predetermined time longer than the first predetermined time from the power supply to the display unit is started, and a display image data generating unit generating image data for being displayed on the display unit until the transition to the capturable state is performed from the display of the display unit is capable of being performed by the display control unit, and the display image data generating unit time-sequentially reduces or magnifies an image formed on the basis of an image which is generated by the imaging unit and allows the image to be displayed on the display unit.

Figure 1:
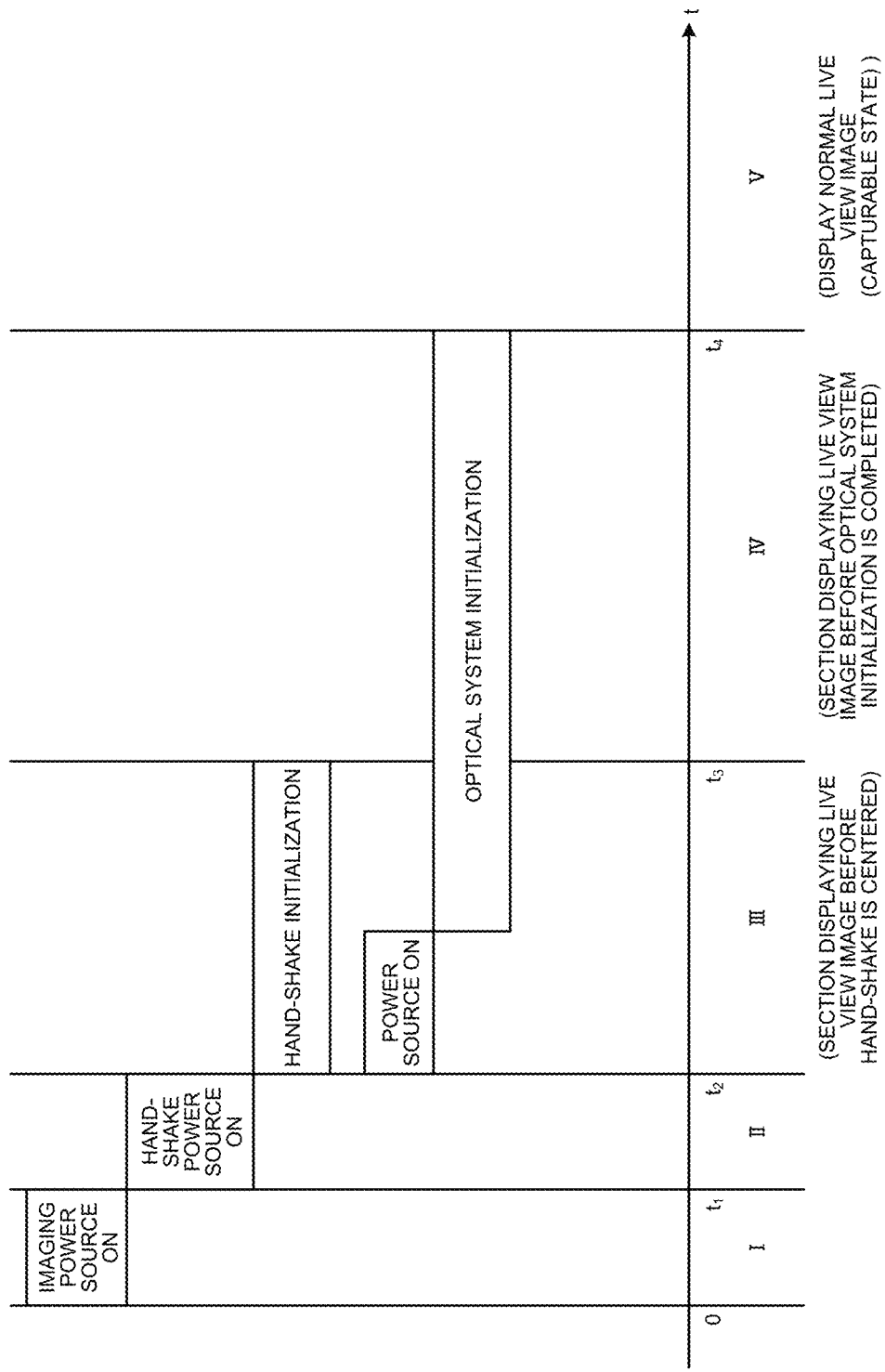
FIG. 1 is a diagram illustrating an operation timing at the time of starting an imaging device according to an embodiment of the present disclosure.

FIG. 1 is a diagram illustrating an operation timing at the time of starting the imaging device according to the embodiment of the present disclosure. A user presses a power source button disposed on the imaging device at time t=0, and thus, an imaging power source is applied (turned on).

After that, the imaging device sequentially starts power supply to various functions in a predetermined order. An initial period I is a period where processing of starting the power supply to the imaging unit is performed. The imaging unit starts the import of an image, and starts power supply to a circuit which performs hand-shake correction, at a time point where time $t_1$ (first predetermined time) elapses from the power supply to the imaging unit is started. A period II is a period where processing of starting the power supply to the circuit which performs the hand-shake correction is performed.

After that, an operation of initializing a hand-shake correction function is started, and power supply to a circuit which drives an optical system is started, at time $t_2$ ($>t_1$). A period III of times $t_2$ to $t_3$ is a period where the operation of initializing the hand-shake correction function is performed. In the period III, the imaging device performs the import of the image, and thus, at least a part of the image which is imaged during this period is displayed on the display unit as a live view image. In addition, in the period III, the imaging device ends power supply processing to the circuit which drives the optical system, and starts an initialization operation in which the optical system reaches a predetermined target state. In the period III, there is a time zone where the initialization operation of the hand-shake correction function and the initialization operation of the optical system are performed in parallel.

The initialization operation of the hand-shake correction function which is started earlier than the initialization operation of the optical system is ended at the time $t_3$, and then, the imaging device continuously performs the initialization operation of the optical system. In a period IV (times $t_3$ to $t_4$) where only the initialization operation of the optical system is performed, at least a part of an image captured during this period is displayed on the display unit as a live view image.

After that, in a period V where the initialization operation of the optical system is ended at time $t_4$ (second predetermined time), the imaging device is in a capturable state, and a general live view image is displayed on the display unit. The capturable state is an imaging standby state where an optical system or a diaphragm is set in a position set in advance and capturing is capable of being performed on the basis of a release signal, or a storage position state where capturing is capable of being performed on the basis of a release signal set in a position of an optical system or a diaphragm which is stored when the power source of the imaging device is turned off.

The imaging device according to this embodiment is capable of allowing an imaged image (a live view image) to be displayed on the display unit before the initialization operation is ended after the power source is applied. For this reason, it is possible to quickly determine a subject to be captured.

First Embodiment

An imaging device according to a first embodiment of the present disclosure generates and displays display image data according to the state of an imaging device during a startup process by using image data imaged in the middle of the startup process which is performed after a power source is applied. More specifically, the imaging device according to this embodiment performs an initialization operation, in which an optical system reaches a predetermined target state, at the time of performing the startup process after the power source is applied, and displays at least a part of an image imaged in the middle of performing the startup process, that is, until the imaging device reaches a capturable state.

Figure 2:
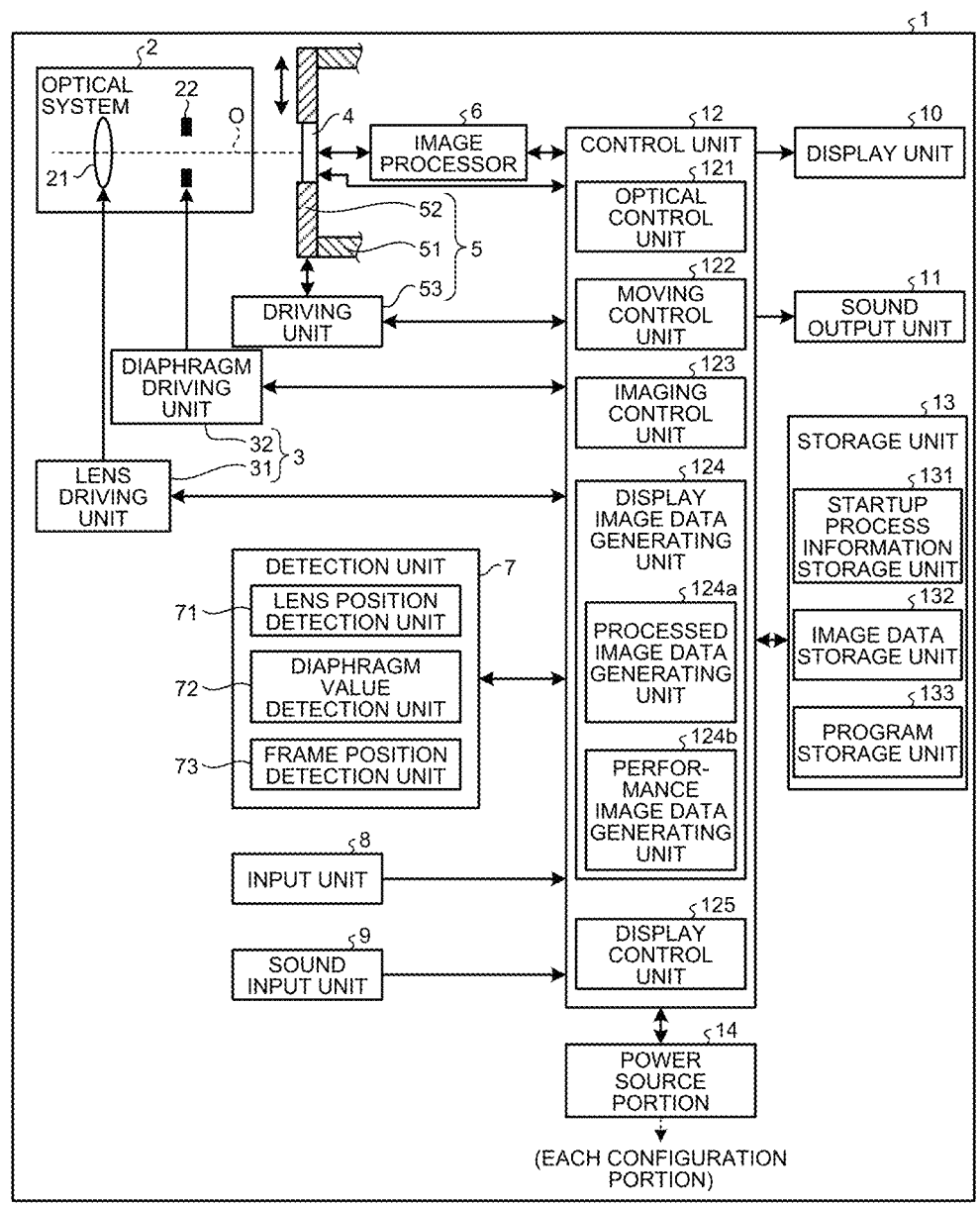
FIG. 2 is a block diagram illustrating a functional configuration of an imaging device according to a first embodiment of the present disclosure.

FIG. 2 is a block diagram illustrating a functional configuration of the imaging device according to the first embodiment of the present disclosure. An imaging device 1 illustrated in the same drawing includes an optical system 2, an optical system driving mechanism 3, an imaging unit 4, a moving mechanism 5, an image processor 6, a detection unit 7, an input unit 8, a sound input unit 9, a display unit 10, a sound output unit 11, a control unit 12, a storage unit 13, and a power source portion 14.

The optical system 2 includes a lens portion 21 condensing light from a predetermined aperture region, and a diaphragm 22 adjusting an incident amount of the light which is condensed by the lens portion 21. The lens portion 21 is configured of one or a plurality of lenses, and has a function of changing a focal point distance of the lens portion 21 by being moved along an optical axis O. Furthermore, in the first embodiment, a configuration will be described in which hand-shake is corrected by driving the imaging unit 4, and the hand-shake is capable of being corrected by driving the optical system 2.

The optical system driving mechanism 3 includes a lens driving unit 31 driving the lens portion 21, and a diaphragm driving unit 32 driving the diaphragm 22. The lens driving unit 31 is configured of a stepping motor, a DC motor, or the like. The lens driving unit 31 moves a lens configuring the lens portion 21 along the optical axis O under the control of the control unit 12. The diaphragm driving unit 32 is configured of a stepping motor or the like, and drives the diaphragm 22 under the control of the control unit 12, and thus, adjusts a light amount of light which is incident on the imaging unit 4.

The lens driving unit 31 and the diaphragm driving unit 32 are set in advance on the basis of conditions such as the properties or the like of the optical system 2 at the time of performing the startup process of the imaging device 1, and each of the lens portion 21 and the diaphragm 22 is driven on the basis of information relevant to operation control of the lens portion 21 and the diaphragm 22 at the time of performing the startup process stored in a startup process information storage unit 131 of the storage unit 13, and thus, each of the focal point distance and a diaphragm value is changed from an initial value to a target value. Here, the target value is a focal point distance and a diaphragm value when the power source of the imaging device 1 is previously turned off. Hereinafter, when the focal point distance and the diaphragm value have a target value, and in the startup process, a state where the optical system 2 has an attainment target will be referred to as a "target state". Furthermore, an operation aspect of the optical system 2 from the initial value to the target value is changed according to the type of the optical system 2. Therefore, for example, when the optical system 2 is detachable from a main body portion of the imaging device 1, it is preferable that the storage unit 13 stores operation information at the time of performing the startup process of a plurality of optical systems 2. In addition, in the case of mounting an optical system 2 which is not stored in the storage unit 13, the control unit 12 controls each of the lens driving unit 31 and the diaphragm driving unit 32 by performing feedback control on the basis of a lens position detected by the detection unit 7 and the information of the diaphragm.

Figure 3:
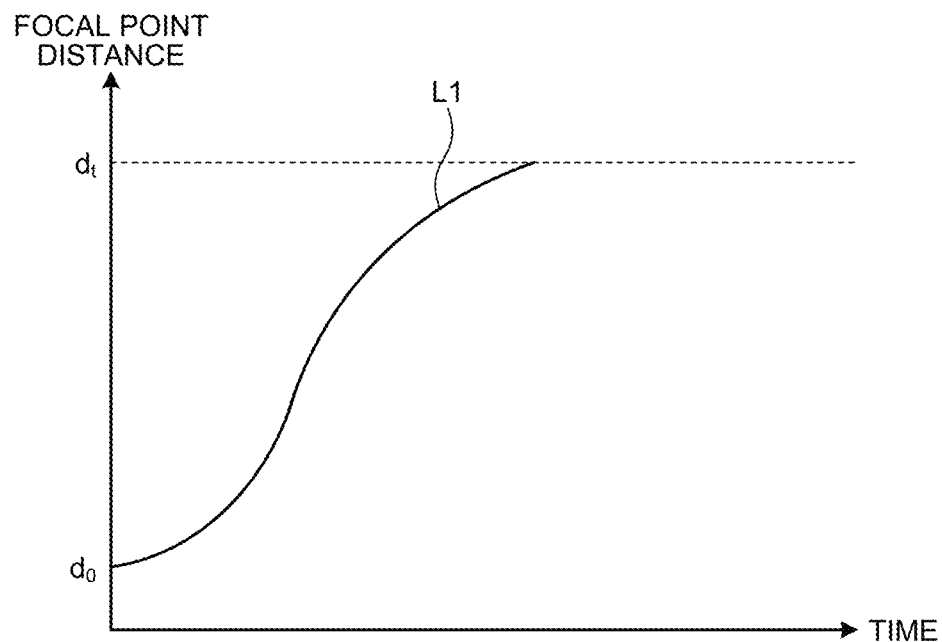
FIG. 3 is a diagram illustrating a time change in a focal point distance when a lens driving unit drives a lens portion in the middle of a startup process of the imaging device according to the first embodiment of the present disclosure.

FIG. 3 is a diagram illustrating a time change in a focal point distance when the lens driving unit 31 drives the lens portion 21 in the middle of the startup process which is performed when the power source of the imaging device 1 is applied. A curve L1 illustrated in the drawing illustrates a time change in a focal point distance when the lens driving unit 31 moves the focal point distance of the lens portion 21 from an initial value do to a target value $d_t$. The lens driving unit 31 drives the lens portion 21 at a differential moving velocity. Furthermore, in FIG. 3, a case is exemplified in which an initial position of the lens portion 21 is on a wide end, but the initial position of the lens portion 21 may be on a tele end instead. In addition, the curve L1 illustrated in FIG. 3 is a behavior in the case of a certain specific optical system 2. In general, time changes in focal point distances at the time of performing the startup process in the optical systems 2 having properties different from each other are different from each other.

Figure 4:
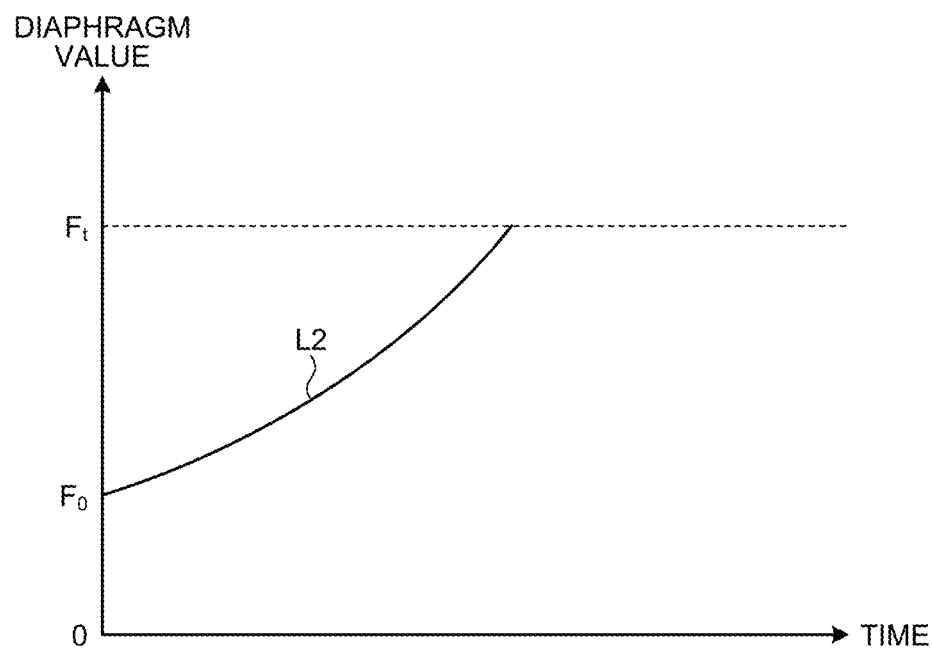
FIG. 4 is a diagram illustrating a time change in a diaphragm value when a diaphragm driving unit drives a diaphragm in the middle of the startup process of the imaging device according to the first embodiment of the present disclosure.

FIG. 4 is a diagram illustrating a time change in a diaphragm value when the diaphragm driving unit 32 drives the diaphragm 22 in the middle of the startup process of the imaging device 1. A curve L2 illustrated in the same drawing illustrates a time change in a diaphragm value when the diaphragm driving unit 32 drives the diaphragm 22 and moves the diaphragm value from an initial value $F_0$ to a target value $F_t$, when the focal point distance of the lens portion 21 is constant. The diaphragm driving unit 32 drives the diaphragm 22 at a differential moving velocity. As with FIG. 3, the curve L2 illustrated in FIG. 4 is a behavior in the case of a certain specific optical system 2. In general, time changes in diaphragm values at the time of performing the startup process in the optical systems 2 having properties different from each other are different from each other.

At the time of performing the startup process of the imaging device 1, The lens driving unit 31 and the diaphragm driving unit 32 may sequentially drive the lens portion 21 and the diaphragm 22, or the lens driving unit 31 and the diaphragm driving unit 32 may be parallel to each other and drive each of the lens portion 21 and the diaphragm 22.

The imaging unit 4 integrally includes an imaging element which photoelectrically converts light subjected to image formation by the optical system 2 and generates an electrical image signal, an optical low pass filter which is disposed on a light receiving surface side of the imaging element and removes a high frequency component from a light flux passing through the optical system 2, and a dust-proof filter which is disposed to face a front surface side (a side on which the optical system 2 is positioned) of the optical low pass filter at a predetermined interval. The imaging element, for example, is configured of an image sensor such as a complementary metal oxide semiconductor (CMOS) or a charge coupled device (CCD). A piezoelectric element is attached to a circumferential portion of the dust-proof filter. The piezoelectric element allows the dust-proof filter to vibrate at a frequency which is set according to the dimension or the material of the dust-proof filter. According to such vibration, dust attached onto the front surface of the dust-proof filter is removed. The imaging unit 4 may be an omnidirectional camera which has been recently spread, or may be a camera built in a personal computer or a monitoring camera. The imaging device according to the first embodiment may have a function of acquiring image data by performing wired communication or wireless communication, but it is not necessary to integrate all constituents of the imaging device.

The moving mechanism 5 includes a fixed frame 51 which is a fixed portion fixed to the main body portion of the imaging device 1, a moving frame 52 which is a movable portion retaining the imaging unit 4 in an aperture portion which is attached to be movable with respect to the fixed frame 51 and is formed such that the optical axis O of the optical system 2 passes through, and a driving unit 53 driving and moving the moving frame 52 with respect to the fixed frame 51 in a predetermined direction. The moving frame 52 is capable of being translated in two directions orthogonal to each other in the plane which is orthogonal to the optical axis O, and is capable of being rotated around the optical axis O. The driving unit 53 drives and moves the moving frame 52 to correct hand-shake, under the control of the control unit 12. The driving unit 53 is configured of any one of a voice coil motor (VCM), a rotary motor, a linear motor, an ultrasonic motor, and the like. When the driving unit 53 is configured of the VCM, the moving mechanism 5 is a VCM moving mechanism including a magnet and a coil. Furthermore, it is possible to represent the capturable state as a state in which the moving frame 52 is moved with respect to an image formation region when the imaging unit 4 disposed on the moving frame 52 is positioned in the basic position such that a region of a part of an imaging region including an optical axis center of the imaging element of the imaging unit 4 is in a state of being included in the image formation region.

The moving mechanism 5 has a function of suppressing a blur on a subject image in the imaging unit 4, which occurs due to the movement of the imaging device 1, by moving the imaging unit 4 according to the movement of the imaging device 1. Furthermore, it is possible to adopt a lens shift manner in which the lens driving unit 31 drives the lens portion 21 and corrects the blur on the subject image, instead of an imaging element shift manner described here, as the hand-shake correction function. Furthermore, it is possible to represent the capturable state in the case of adopting the lens shift manner as a state in which the movable portion on which the lens portion 21 is disposed is moved with respect to the image formation region on the imaging element when the lens portion 21 is positioned in the basic position such that the lens portion 21 is positioned in a position different from the basic position and the region of a part of the imaging region including the optical axis center of the imaging element at this time is in a state of being included in the image formation region.

Furthermore, when the power source of the imaging device 1 is turned off, the driving unit 53 may move the moving frame 52 to a position (hereinafter, referred to as an initial position) in which the optical axis O and an image center of the imaging element are shifted from each other. This position may be changed according to a state immediately before the power source is turned off, or may be the same position regardless of the state immediately before the power source is turned off. For example, when the driving unit 53 is configured of the VCM, when the power source is turned off, the VCM is in a non-excited state, and the imaging element is moved to the initial position. After that, when the power source is applied, the driving unit 53 executes the initialization operation in which the moving frame 52 is moved such that the optical axis O is coincident with the center of the imaging region of the imaging element under the control of the control unit 12.

The image processor 6 generates an image on the basis of image data which is generated and output by the imaging unit 4. The image processor 6 performs various image processing to the image data. Specifically, the image processor 6 performs image processing including optical black subtraction processing, white balance adjustment processing, color matrix arithmetic processing, y correction processing, color reproduction processing, edge enhancement processing, and the like, to the image data. The image processor 6 is configured of a dedicated integrated circuit or the like executing a specific function such as a general-purpose processor of a central processing unit (CPU) or the like, or an application specific integrated circuit (ASIC) or a field programmable gate array (FPGA).

The detection unit 7 includes a lens position detection unit 71 detecting the position of the lens portion 21, a diaphragm value detection unit 72 detecting the diaphragm value of the diaphragm 22, and a frame position detection unit 73 detecting the position of the moving frame 52. The lens position detection unit 71 is configured of a photo interrupter or the like. The diaphragm value detection unit 72 is configured of a linear encoder, a potentiometer, or the like. The frame position detection unit 73 includes a position detect sensor detecting the position of the moving frame 52, two acceleration sensors respectively detecting the acceleration of two translate directions of the moving frame 52, and three gyro sensors detecting an angular velocity of the rotation of the imaging device 1 around each of two axes including an axis parallel to the optical axis O and an axis orthogonal to the optical axis O. The position detect sensor, for example, is configured of a hall element disposed on the fixed frame 51, and a magnet disposed on the moving frame 52 to face the hall element. The acceleration sensor and the gyro sensor are disposed on the fixed frame 51.

The input unit 8 is configured of a user interface such as various switches which are disposed on the front surface of the main body of the imaging device 1 and include a release switch receiving the input of a release signal instructing still image capturing or a moving image switch receiving the input of an instruction for the start and the end of the moving image capturing, various buttons including a power source button receiving the input of an instruction signal of on/off of the power source, and a touch panel which is disposed on a screen display area of the display unit 10 by being laminated and receives the input of a signal according to a contact position of an object from the outside.

The sound input unit 9 is configured of a microphone or the like which collects the outside sound and generates sound data.

The display unit 10 is configured of a display panel formed of a liquid crystal or organic electro luminescence (EL), or the like. The display unit 10 is capable of performing rec view display where image data according to the release signal of which the input is received in the input unit 8 is displayed for a predetermined time (for example, for 3 seconds), reproduction display where image data stored in the storage unit 13 is played back, live view image display where an image corresponding to image data continuously generated by the imaging unit 4 is sequentially displayed, and the like. In addition, the display unit 10 is capable of displaying operation information of the imaging device 1 and information relevant to an imaging operation. Furthermore, the display unit 10 may have configured separately from the imaging device, such as a wearable display device. In this case, the display unit 10 displays an image corresponding to image data which is transmitted from the control unit 12 in a wireless manner or a wired manner.

The sound output unit 11 is configured of a speaker or the like, which outputs sound, and outputs sound corresponding to sound data generated by the sound input unit 9 or sound set according to various operations of the imaging device 1.

The control unit 12 includes an optical control unit 121 controlling the operation of the optical system 2 by controlling the optical system driving mechanism 3, a moving control unit 122 controlling the operation of the moving mechanism 5, an imaging control unit 123 controlling the operation of the imaging unit 4, a display image data generating unit 124 generating display image data to be displayed on the display unit 10 on the basis of the image data generated by the imaging unit 4, and a display control unit 125 controlling the display on the display unit 10.

The optical control unit 121 performs the setup of the optical system 2 in the middle of the startup process in which the moving mechanism 5 of the imaging device 1 moves the imaging unit 4 from the initial position to a predetermined position where the optical axis O of the optical system 2 passes through. At this time, the optical control unit 121 reads out the position of the lens portion 21 and the diaphragm value of the diaphragm 22 when the power source of the imaging device 1 is previously turned off from the storage unit 13, and controls the optical system driving mechanism 3 by using the read out value as the target value, and thus, performs the setup of the optical system 2.

The optical control unit 121 has a function of controlling the optical system driving mechanism 3 on the basis of the image data generated by the imaging unit 4, or a detection result of the lens position detection unit 71 and the diaphragm value detection unit 72, in addition to a setup function described above. For example, the optical control unit 121 drives the lens portion 21 by controlling the lens driving unit 31 on the basis of the image data generated by the imaging unit 4 or the detection result of the lens position detection unit 71, and thus, executes automatic focus (AF) processing. In addition, the optical control unit 121 adjusts the diaphragm value of the diaphragm 22 by controlling the diaphragm driving unit 32 on the basis of the image data generated by the imaging unit 4 or the detection result of the diaphragm value detection unit 72, and thus, executes automatic exposure (AE) processing.

The moving control unit 122 calculates a hand-shake compensation amount on the basis of the detection result of the frame position detection unit 73, controls the driving unit 53 of the moving mechanism 5 according to the calculated hand-shake compensation amount, and drives the moving frame 52. Furthermore, the moving control unit 122 may control the driving unit 53 when the power source of the imaging device 1 is applied, and may move the position of the imaging unit 4 to a position at a time point where the power source is previously turned off. When the driving unit 53 is configured of the VCM, the moving control unit 122 is a VCM moving control unit enabling the movable portion to be operated after a predetermined time from power supply to the coil of the moving mechanism 5 is started in response to the input of the power source.

The imaging control unit 123 controls the imaging operation of the imaging unit 4. The imaging control unit 123 allows the imaging unit 4 to execute the imaging operation even while the imaging device 1 performs the startup process. In addition, when the input unit 8 receives the input of a start instruction signal of the still image capturing, the imaging control unit 123 allows the imaging unit 4 to start the still image capturing, and when the input unit 8 receives the input of a start or end instruction signal of the moving image capturing, the imaging control unit 123 performs control of allowing the imaging unit 4 to start or end the moving image capturing.

The display image data generating unit 124 generates display image data according to the state of the imaging device 1 during the startup process by using the image data generated by the imaging unit 4 in the middle of the startup process. The display image data generating unit 124 performs processing according to a start mode which is set with respect to the startup process of the imaging device 1. In the first embodiment, any one of a "processing mode", a "performance mode", a "live view image display mode", and a "normal mode" is capable of being set as the start mode of the imaging device 1.

The processing mode is a mode in which a processed image as a display image obtained by adjusting the size and the brightness of the image data such that a field angle and the brightness are coincident with those in the target state is displayed on the display unit 10, until the optical system reaches the target state during the startup process.

The performance mode is a mode in which a performance image as a display image is displayed on the display unit 10 by directly displaying the field angle and the brightness of the acquired image data and by adding information representing that the startup process is in progress, until the optical system reaches the target state during the startup process.

The live view image display mode is a mode in which the image data generated by the imaging unit 4 is directly displayed on the display unit 10 during the startup process.

The normal mode is a mode in which an image imaged by the imaging unit 4 is not displayed on the display unit 10 until the startup process is completed. When the normal mode is set, the imaging unit 4 may be set such that the imaging operation is not performed in the middle of the startup process.

Figure 5A:
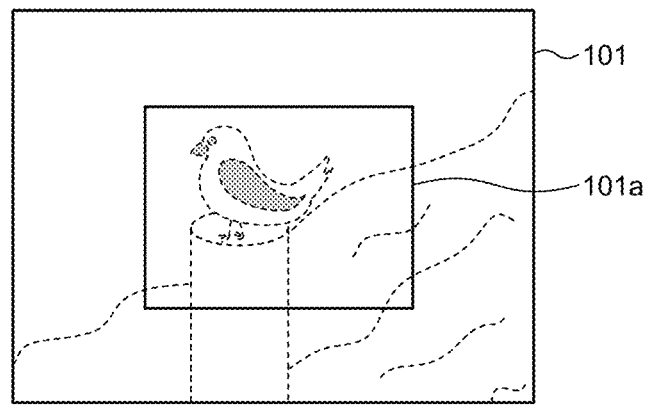
FIG. 5A is a diagram illustrating an (first) image example which is imaged during the startup process of the imaging device according to the first embodiment of the present disclosure.
Figure 5B:
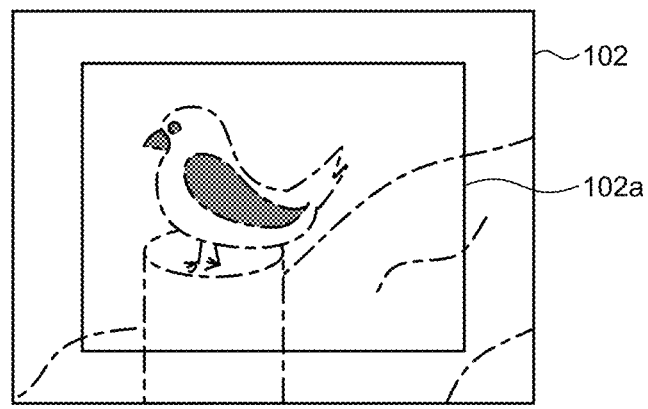
FIG. 5B is a diagram illustrating an (second) image example which is imaged during the startup process of the imaging device according to the first embodiment of the present disclosure.
Figure 5C:
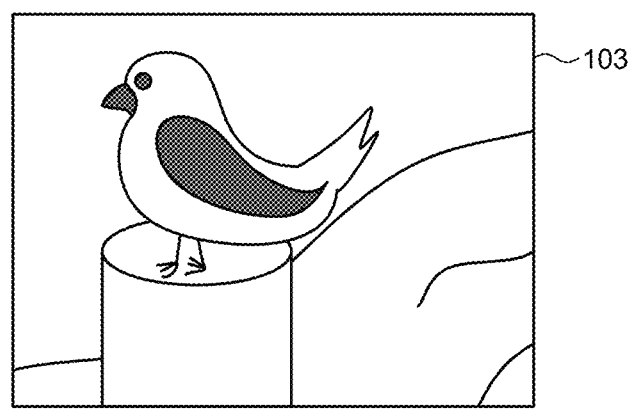
FIG. 5C is a diagram illustrating an (third) image example which is imaged during the startup process of the imaging device according to the first embodiment of the present disclosure.

The display image data generating unit 124 includes a processed image data generating unit 124a and a performance image data generating unit 124b. Hereinafter, a processing outline of the processed image data generating unit 124a and the performance image data generating unit 124b will be described. In the following description, a case will be described in which the imaging device 1 sequentially images the images illustrated in FIGS. 5A to 5C during the startup process, as an example. An image 101 illustrated in FIG. 5A is an image which is captured in a state where the focal point distance and the diaphragm value are close to the initial value. An image 102 illustrated in FIG. 5B is an image which is captured in a state where the focal point distance and the diaphragm value are greater than those of the image 101 (a state where the field angle is less than that of the image 101 and the brightness is lower than that of the image 101). An image 103 illustrated in FIG. 5C is an image which is captured in the target state. Regions 101a and 102a respectively illustrated in FIGS. 5A and 5B are regions corresponding to the field angle in the target state.

First, the processed image data generating unit 124a will be described. When the start mode is set to the processing mode, the processed image data generating unit 124a performs image magnification or reduction, brightness adjustment, and the like with respect to the acquired image data, and thus, generates image data (processed image data) having a field angle approximately identical to the field angle in the target state and a brightness. As illustrated in FIG. 3, when the initial position of the lens portion 21 is on the wide end, the processed image data generating unit 124a magnifies the image. In contrast, when the initial position of the lens portion 21 is on the tele end, the processed image data generating unit 124a reduces the image. The processed image data generating unit 124a calculates the current focal point distance from a lens position which is detected by the lens position detection unit 71 in the middle of the startup process, and then, calculates a difference between the current focal point distance and the target value of the focal point distance acquired from the startup process information storage unit 131, and magnifies or reduces the image to have the same field angle as that in the target state, on the basis of the difference. In addition, the processed image data generating unit 124a adjusts the brightness of the acquired image data and generates the processed image data on the basis of a difference between the diaphragm value detected by the diaphragm value detection unit 72 and the target value of the diaphragm value acquired from the storage unit 13. Furthermore, the processed image data generating unit 124a may magnify or reduce the image to which a field angle variation according to a focus is added. For example, when the lens portion 21 includes an inner focus lens, the field angle is changed according to the position of the focus, and thus, in consideration of such a circumstance, the processed image data generating unit 124a performs processing to the image data such that the field angle is not changed.

When the image is sequentially subjected to magnification or reduction display on the display unit 10, the processed image data generating unit 124a generates the processed image data on the basis of the focal point distance value of the display state in which the display of the display unit 10 is capable of being performed by the display control unit 125, and the diaphragm value at this time. In this case, when the imaging device transitions to the capturable state, the processed image data generating unit 124a generates the processed image data which is matched with the focal point distance value and the diaphragm value at this time.

Figure 6A:
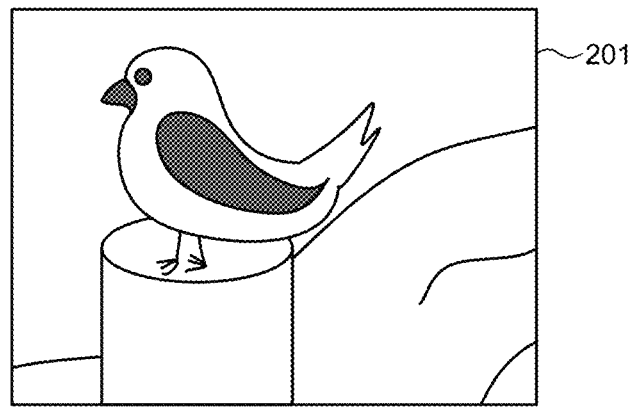
FIG. 6A is a diagram illustrating a (first) display example of a processed image corresponding to processed image data which is generated by a processed image data generating unit of the imaging device according to the first embodiment of the present disclosure.
Figure 6B:
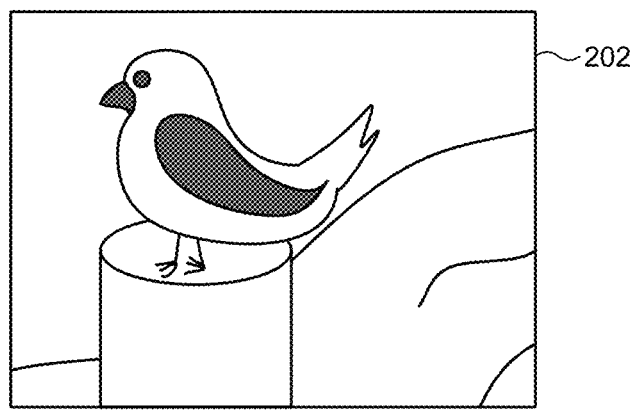
FIG. 6B is a diagram illustrating a (second) display example of the processed image corresponding to the processed image data which is generated by the processed image data generating unit of the imaging device according to the first embodiment of the present disclosure.
Figure 6C:
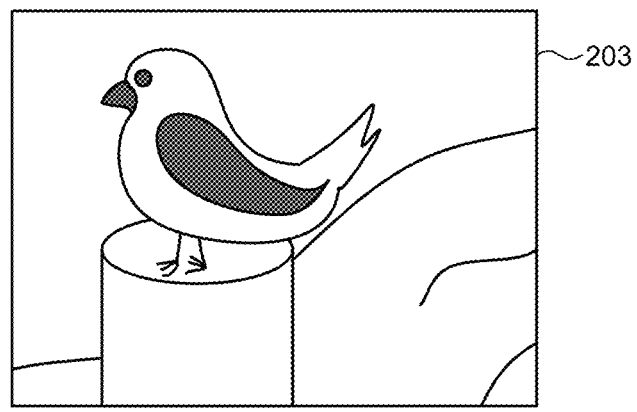
FIG. 6C is a diagram illustrating a (third) display example of the processed image corresponding to the processed image data which is generated by the processed image data generating unit of the imaging device according to the first embodiment of the present disclosure.

FIGS. 6A to 6C are diagrams illustrating display examples of the processed image corresponding to the processed image data which is generated by the processed image data generating unit 124a when the images illustrated in FIGS. 5A to 5C are sequentially imaged. Processed images 201 to 203 illustrated in FIGS. 6A to 6C are processed images respectively corresponding to the images 101 to 103 illustrated in FIGS. 5A to 5C. The processed image 201 is an image which is generated by magnifying the region 101a of the field angle corresponding to the image 103 in the image 101, and by darkening the brightness of the image 101 to be matched with the brightness of the image 103. The processed image 202 is an image which is generated by magnifying the region 102a of the field angle corresponding to the image 103 in the image 102, and by darkening the brightness of the image 102 to be matched with the brightness of the image 103. The processed image 203 is the same image as the image 103 which is captured in the target state. Thus, the processed images 201 to 203 have approximately the same display contents, and all of the processed images 201 to 203 have the same display contents as those of the image 103 captured in the target state.

Next, the performance image data generating unit 124b will be described. When the start mode is set to the performance mode, the performance image data generating unit 124b generates performance image data in which a portion corresponding to the field angle of the image in the target state is trimmed in the image with respect to the acquired image data, the portion trimmed in the image is masked, and information representing that the startup process is in progress added to the portion.

Figure 7A:
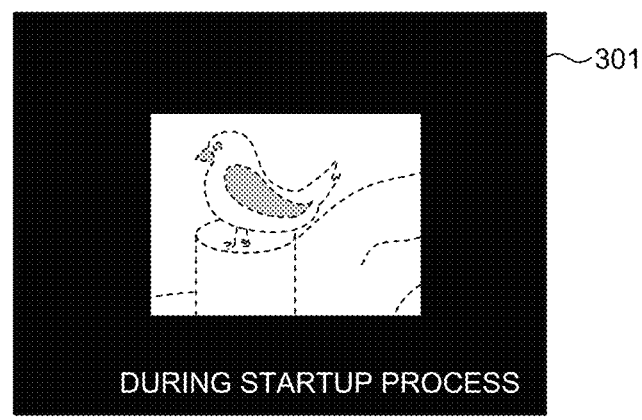
FIG. 7A is a diagram illustrating a (first) display example of a performance image corresponding to performance image data which is generated by a performance image data generating unit of the imaging device according to the first embodiment of the present disclosure.
Figure 7B:
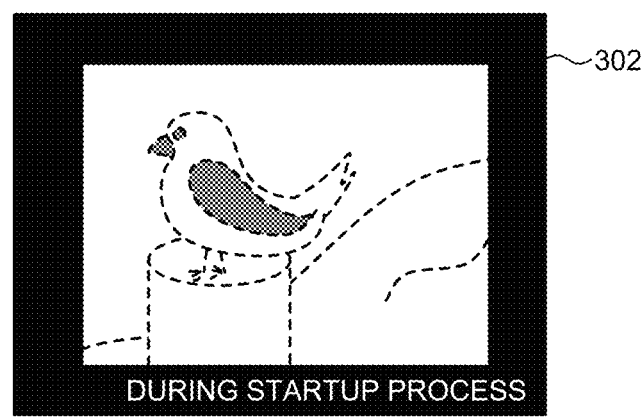
FIG. 7B is a diagram illustrating a (second) display example of the performance image corresponding to the performance image data which is generated by the performance image data generating unit of the imaging device according to the first embodiment of the present disclosure.
Figure 7C:
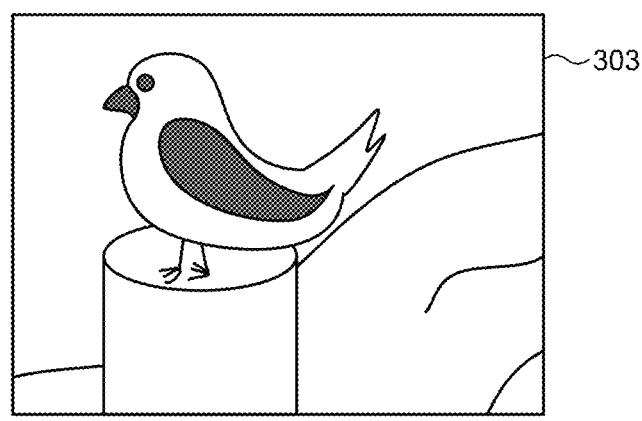
FIG. 7C is a diagram illustrating a (third) display example of the performance image corresponding to the performance image data which is generated by the performance image data generating unit of the imaging device according to the first embodiment of the present disclosure.

FIGS. 7A to 7C are diagrams illustrating display examples of the performance image corresponding to the performance image data which is generated by the performance image data generating unit 124b when the images illustrated in FIGS. 5A to 5C are sequentially imaged. Performance images 301 to 303 illustrated in FIGS. 7A to 7C are performance images respectively corresponding to the images 101 to 103 illustrated in FIGS. 5A to 5C. The performance images 301 and 302 respectively display images of regions corresponding to the region 101a illustrated in FIG. 5A or the region 102a illustrated in FIG. 5B, and display the characters of "during startup process" in the masked portion around the regions. The performance image 303 is an image in which the field angle and the brightness reach the target state, and displays the same display contents as those of the image 103.

As exemplified in FIGS. 7A to 7C, the performance image data generating unit 124b displays only the region corresponding to the field angle in the target state at the brightness at the time of being acquired with respect to the acquired image data, and when there are other portions, masks the portion, adds information representing that the startup process is in progress to the masked portion, and thus, generates the performance image data. Furthermore, the information added by the performance image data generating unit 124b is not limited to the textual information. For example, the performance image data generating unit 124b may add information of the focal point distance and the diaphragm value or information representing an aspect of a time change therein. In addition, the performance image data generating unit 124b may add information representing that it is in the middle of the magnification of the image in which the focal point distance increases towards the target state and the image is enlarged by illustrating an outward arrow in the masked region. Thus, insofar as some performance effects for representing that the startup process is in progress are capable of being expected, various information items are capable of being assumed as the information added by the performance image data generating unit 124b.

The display control unit 125 allows the display image corresponding to the display image data generated by the display image data generating unit 124 to be displayed on the display unit 10 in the middle of the startup process.

The control unit 12 having the functional configuration described above is configured of a dedicated integrated circuit executing a specific function, such as a general-purpose processor of a CPU or the like, or an ASIC or a FPGA.

The storage unit 13 includes the startup process information storage unit 131 storing information relevant to the start mode of the startup process or information relevant to the operation control of the lens portion 21 and the diaphragm 22 at the time of performing the startup process, an image data storage unit 132 storing data of various images, and a program storage unit 133 storing various programs including a startup process program for executing a startup method of the imaging device according to the first embodiment.

The storage unit 13 is configured of a volatile memory such as a random access memory (RAM) and a non-volatile memory such as a read only memory (ROM). Among them, the RAM has a function as a temporary storage unit which temporarily stores processed image data input from the image processor 6 and information during the processing of the imaging device 1. Furthermore, the storage unit 13 may be configured of a computer readable recording medium such as a memory card mountable from the outside.

When input unit 8 receives the input of a signal turning on the power source, the power source portion 14 converts a voltage of a cell to a voltage which is required for each configuration portion of the imaging device 1, and supplies the voltage, under the control of the control unit 12. In contrast, when the input unit 8 receives the input of a signal turning off the power source, the power source portion 14 stops the supply of the voltage with respect to each of the configuration portions under the control of the control unit 12. The power source portion 14 is configured of a secondary cell such as a chargeable lithium ion cell.

The imaging device 1 has been described as being integrated, but for example, it is possible to realize the same function as that of the imaging device 1 by connecting a lens type camera to be communicated with an information terminal such as a smart phone in a wireless manner. In this case, the smart phone includes at least the input unit 8 and the display unit 10, and wireless communication is performed between the smart phone and the lens type camera through Wi-Fi (Registered Trademark) or the like, and thus, the image data is received. Furthermore, it is also possible to have such a function by downloading an application having the function of the display image data generating unit 124 with respect to the smart phone from the outside server through a communication network. Further, a camera built in a personal computer, a monitoring camera, a wearable terminal, a portable terminal, and the like are capable of being functioned as the imaging device 1. Furthermore, a portion represented by the imaging unit may be an imaging input unit, an image signal input unit, or an image input unit.

Figure 8:
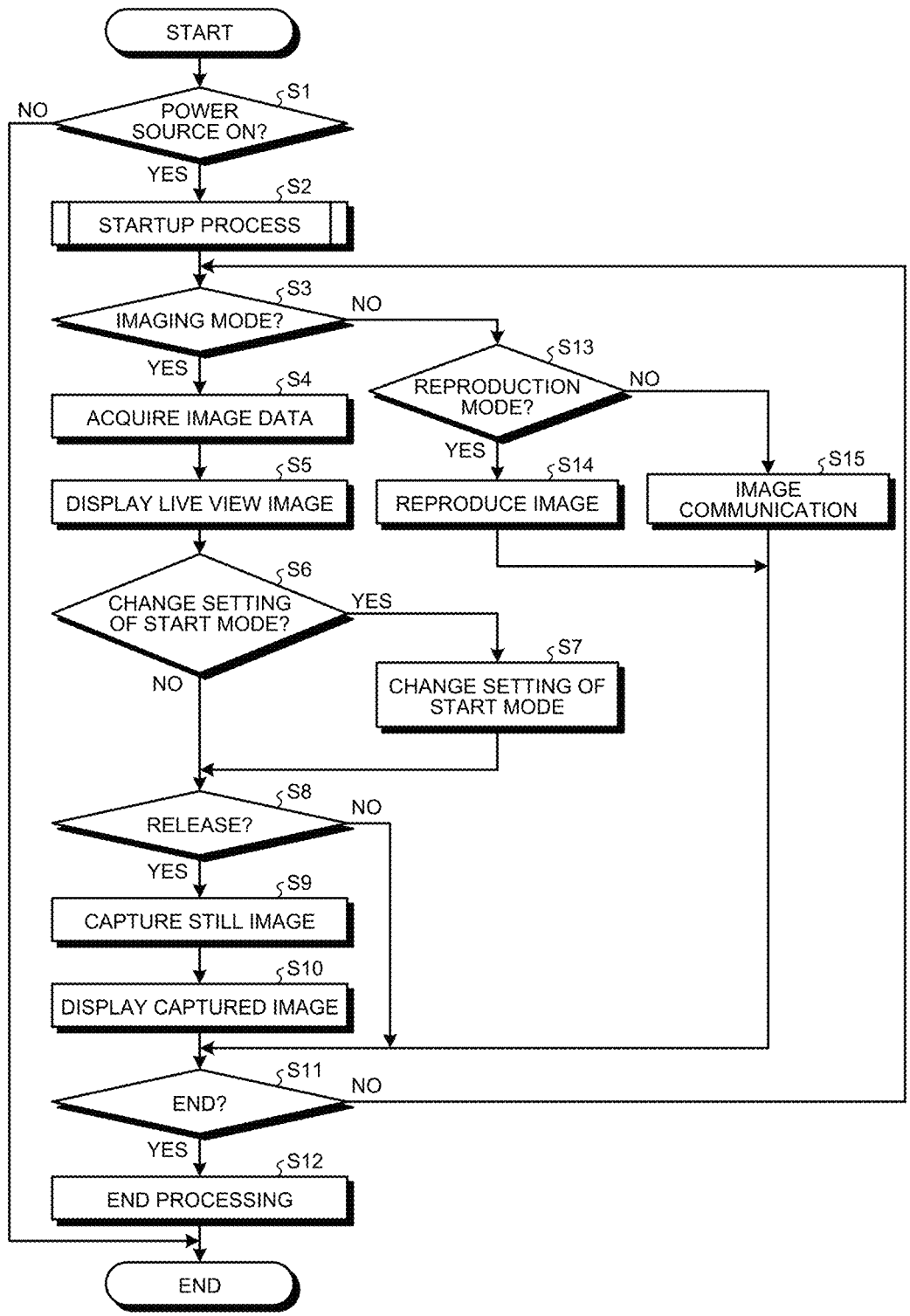
FIG. 8 is a flowchart illustrating an outline of processing which is performed by the imaging device according to the first embodiment of the present disclosure.

FIG. 8 is a flowchart illustrating the outline of the processing performed by the imaging device 1. First, when a power source button of the input unit 8 receives the input of the instruction signal representing that the power source is turned on (Step S1: Yes), the imaging device 1 performs the startup process (Step S2). When the power source is not applied (Step S1: No), the imaging device 1 ends the processing without performing any processing.

Figure 9:
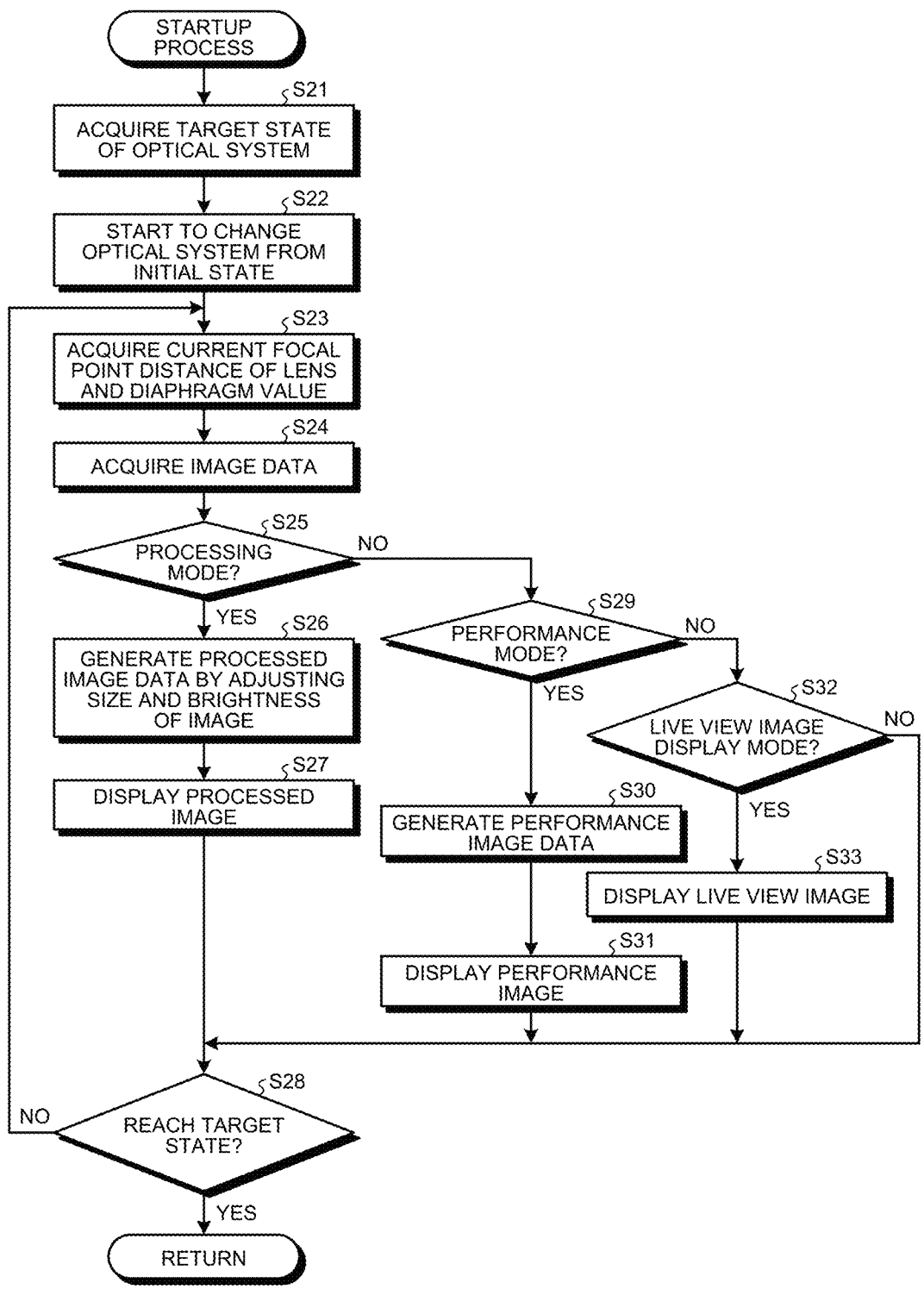
FIG. 9 is a flowchart illustrating an outline of the startup process.

Hereinafter, the outline of the startup process of Step S2 will be described with reference to a flowchart illustrated in FIG. 9. First, the optical control unit 121 acquires the target state of the optical system 2 from the storage unit 13 (Step S21). Here, the target state indicates the state of the optical system 2 when the imaging device 1 previously turns off the power source.

After that, the optical control unit 121 starts to change the state of the optical system 2 from the initial state on the basis of the target state (Step S22). Specifically, the optical control unit 121 controls the lens driving unit 31 and the diaphragm driving unit 32 such that the position of the lens portion 21 and the diaphragm value of the diaphragm 22 reach the target state.

Subsequently, the control unit 12 acquires the focal point distance of the lens portion 21 and the diaphragm value of the diaphragm 22 from the detection unit 7 (Step S23).

Subsequently, the control unit 12 acquires the image data which is generated by the imaging unit 4 in the middle of the startup process under the control of the imaging control unit 123 and is subjected to the processing of the image processor 6 (Step S24).

After that, the control unit 12 determines whether or not the set start mode is the processing mode (Step S25). When the set start mode is the processing mode (Step S25: Yes), the processed image data generating unit 124a generates the processed image data in which the size and the brightness of the image corresponding to the acquired image data are adjusted (Step S26). For example, the processed image data generating unit 124a performs the processing of magnifying the portion corresponding to the field angle of the image 103 in the target state by trimming the portion and of darkening the image by changing the gain of the image which is trimmed to have the same brightness as that of the image 103 in the target state, with respect to the image 101 illustrated in FIG. 5A or the image 102 illustrated in FIG. 5B, and thus, generates the processed image data items respectively corresponding to the processed image 201 illustrated in FIG. 6A or the processed image 202 illustrated in FIG. 6B. Furthermore, in the first embodiment, it is assumed that the diaphragm 22 is opened or is in a state of being diaphragmed from a state close to a state where the diaphragm 22 is opened, and thus, the processing of magnifying the trimmed image and of darkening the trimmed image is performed, but in contrast, a lens system may be used in which the diaphragm 22 is changed to a direction where the diaphragm 22 is opened from the state where the diaphragm 22 is diaphragmed or a state where the diaphragm 22 is diaphragmed to have a predetermined size. In this case, in Step S26, processing of magnifying the trimmed image, and then, of brightening the trimmed image is performed, and thus, the processing data is generated.

After that, the display unit 10 displays the processed image under the control of the display control unit 125 (Step S27). At this time, the processed image to be displayed, for example, is the processed images 201 to 203 illustrated in FIGS. 6A to 6C. When the start mode is set to the processing mode, the display contents of the processed image during the startup process are approximately the same.

After that, the optical control unit 121 determines whether or not the optical system 2 reaches the target state on the basis of the information of the optical system 2 acquired from the detection unit 7 (Step S28). When the optical system 2 reaches the target state (Step S28: Yes), the imaging device 1 ends the startup process. In contrast, when the optical system 2 does not reach the target state (Step S28: No), the imaging device 1 is returned to Step S23.

Next, in Step S25, a case will be described in which it is determined that the set start mode is not the processing mode (Step S25: No). In this case, when the set start mode is the performance mode (Step S29: Yes), the performance image data generating unit 124b generates the performance image data (Step S30). For example, the performance image data generating unit 124b trims the portion corresponding to the field angle of the image 103 of the target state with respect to the image 101 illustrated in FIG. 5A or the image 102 illustrated in FIG. 5B, masks the region around the portion, and adds the characters of "during startup process" to the masked portion, and thus, generates the performance image data items respectively corresponding to the performance image 301 illustrated in FIG. 7A or the performance image 302 illustrated in FIG. 7B.

After that, the display unit 10 displays the performance image under the control of the display control unit 125 (Step S31). At this time, the performance image to be displayed, for example, is the performance images 301 to 303 illustrated in FIGS. 7A to 7C. After Step S31, the imaging device 1 proceeds to Step S28.

In Step S29, a case will be described in which the set start mode is not the performance mode (Step S29: No). In this case, when the set start mode is the live view image display mode (Step S32: Yes), the display control unit 125 allows the live view image to be displayed on the display unit 10 (Step S33). After that, the imaging device 1 proceeds to Step S28. In contrast, in Step S32, when the set start mode is not the live view image display mode (Step S32: No), the start mode is the normal mode, and thus, the imaging device 1 proceeds to Step S28.

Furthermore, when the input of the start instruction signal of the capturing is received in the release switch of the input unit 8 in the middle of displaying the processed image, the performance image, or the live view image on the display unit 10, the imaging device 1 may perform still image capturing. Accordingly, the user is capable of acquiring a desired image even during startup process.

The processing performed by the imaging device 1 after the startup process (Step S2) described above will be described with reference to the flowchart illustrated in FIG. 8 again. First, a case will be described in which the imaging device 1 is set to be in a imaging mode (Step S3: Yes). In this case, the imaging control unit 123 performs the AE processing and the AF processing by acquiring the image data from the image processor 6 (Step S4). Subsequently, the display control unit 125 generates the live view image on the basis of the image data, and allows the live view image to be displayed on the display unit 10 (Step S5).

After that, when the input unit 8 receives the input of the instruction signal of the setting change in the start mode (Step S6: Yes), the control unit 12 changes the setting of the start mode (Step S7). In Step S6, when the input unit 8 does not receive the input of the instruction signal of the setting change in the start mode (Step S6: No), the imaging device 1 proceeds to Step S8 described below.

Figure 10:
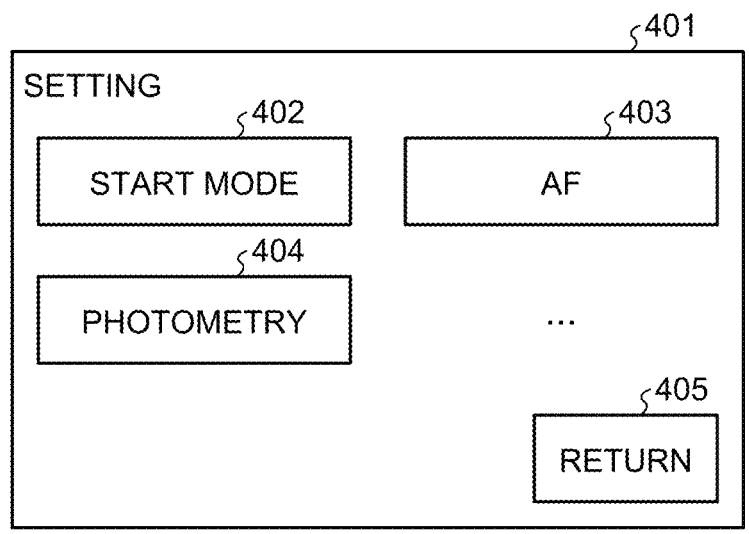
FIG. 10 is a diagram illustrating a display example of a setting screen in a display unit, which includes setting change of a start mode.

In Step S7, a setting screen for urging the user to perform setting input is displayed on the display unit 10. FIG. 10 is a diagram illustrating a display example of the setting screen including the setting change in the start mode in the display unit 10. When the input unit 8 receives the input of a display instruction signal of the setting screen, the display control unit 125 allows a setting screen 401 to be displayed on the display unit 10. The setting screen 401 includes a return icon 405 for being returned to a live view image display screen in addition to various setting icons such as a start mode icon 402 for setting the start mode, an AF icon 403 for setting an automatic focus, and a photometric icon 404 for setting photometry. When a region corresponding to a display position of each of the icons is touched, the touch panel configuring a part of the input unit 8 detects the touch, and receives the input of a signal according to a touch position. When the region of the start mode icon 402 is touched, the display control unit 125 allows a start mode selection screen to be displayed on the display unit 10.

Figure 11:
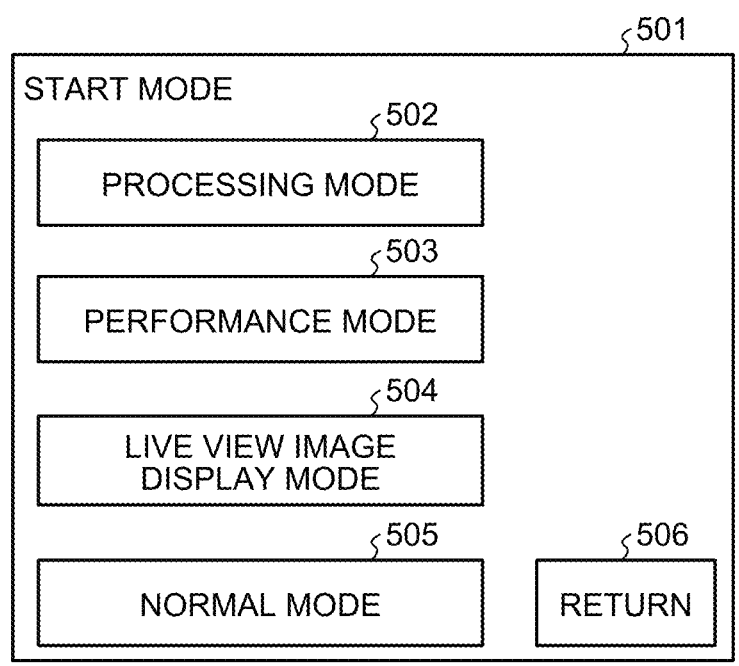
FIG. 11 is a diagram illustrating a display example of a start mode selection screen in the display unit.

FIG. 11 is a diagram illustrating a display example of the start mode selection screen in the display unit 10. A start mode selection screen 501 illustrated in the same drawing includes a return icon 506 for being returning to the setting screen 401 in addition to a processing mode icon 502 for selecting the processing mode, a performance mode icon 503 for selecting the performance mode, a live view image display mode icon 504 for selecting the live view image display mode, and a normal mode icon 505 for selecting the normal mode. When the user touches an icon corresponding to a desired mode, the touch panel receives the input of the mode selection signal according to the touch position. The control unit 12 changes the setting of the start mode on the basis of the input setting instruction signal.

Furthermore, when any one of mode selection icons is touched on the start mode selection screen 501, and the input of the corresponding mode selection signal is received, transition may be performed to a screen displaying a sample of a display image corresponding to the selected start mode. In this case, a determination icon determining the selection of the start mode and the return icon for being returning to the start mode selection screen 501 are displayed on the display unit 10 along with a sample image. Thus, the display unit 10 displays the sample of the display image, and thus, the user is capable of confirming a display aspect of the start mode by observing the sample, and therefore, even when the user is not accustomed to the operation of the imaging device 1, it is possible to intuitively grasp the start mode, and to simply select a preferred start mode.

After Step S7, the release switch of the input unit 8 receives the input of the release signal (Step S8: Yes), the imaging device 1 performs the still image capturing (Step S9), and the display unit 10 displays the captured image (Step S10). Furthermore, the captured image may be displayed for a predetermined time (for example, for approximately several seconds), and then, the setting screen 401 may be returned to the live view image display.

After that, when the power source button of the input unit 8 receives the input of the instruction signal representing that the power source is turned off, and the processing of the imaging device 1 is ended (Step S11: Yes), the control unit 12 performs end processing (Step S12). The end processing includes processing of storing the state of the optical system 2 in the storage unit 13 and processing of returning the optical system 2 to a predetermined initial state. Furthermore, when the imaging element is returned to the initial position, the driving unit 53 includes processing of moving the imaging element to the initial position under the control of the control unit 12.

After that, the imaging device 1 ends the processing. In Step S11, when the power source button of the input unit 8 does not receive the input of the instruction signal representing that the power source is turned off (Step S11: No), the imaging device 1 is returned to Step S3.

In Step S8, when the input unit 8 does not receive the input of the release signal (Step S8: No), the imaging device 1 proceeds to Step S11.

Next, in Step S3, a case will be described in which the imaging device 1 is not set to the imaging mode (Step S3: No). In this case, when the imaging device 1 is set to the reproduction mode (Step S13: Yes), the imaging device 1 plays back the image (Step S14). In reproduction processing of the image, first, the display unit 10 displays a thumbnail image, and then, magnifies an image selected from the user, and performs reproduction display with respect to the magnified image. After that, the imaging device 1 proceeds to Step S11.

In Step S13, when the imaging device 1 is not set to the reproduction mode (Step S13: No), the imaging device 1 performs image communication with respect to other devices (Step S15). After that, the imaging device 1 proceeds to Step S11. Furthermore, image communication processing in the case of not being set to the reproduction mode is merely an example. When the imaging device 1 is capable of executing other processing modes, the imaging device 1 may proceed to other modes, and may execute the processing.

Furthermore, in the above description, even when the imaging device 1 is set to the reproduction mode when the power source of the imaging device 1 is applied, the processing (the startup process) of Step S2 is performed, but when the imaging device 1 is set to the reproduction mode when the power source is applied, the processing of Step S2 may be not performed.

In addition, when a moving image start button of the input unit 8 is pressed, the imaging device 1 may proceed to the startup process, and may start the moving image capturing. In this case, an operation of only turning on the power source is not necessary, and thus, it is possible for a user to start the moving image capturing approximately at the same time as the power source is turned on. As a result thereof, the capturing is performed immediately after the capturing is planned, and thus, it is possible to more reliably capture a desired scene without missing a decisive scene.

According to the first embodiment of the present disclosure described above, the imaging control unit operating the imaging unit in the middle of the startup process performed after the power source is applied, the display image data generating unit generating the display image data according to the state of the imaging device by using the image data generated in the middle of the startup process, and the display control unit allowing the image corresponding to the display image data generated by the display image data generating unit to be displayed on the display unit in the middle of the startup process are provided, and thus, it is possible to swiftly display the image which is imaged after the power source is applied.

In addition, according to the first embodiment, when the optical system is driven in the startup process and is changed to the target state, the display image data according to a relationship between the state of the optical system and the target state is generated, and thus, it is possible to display the image while the optical system reaches the target state.

In addition, according to the first embodiment, the processed image data is generated as the display image data by adjusting the size and the brightness of the image data which is imaged by the imaging unit to be matched with the target state, and thus, it is possible to perform the display in an aspect where the size or the brightness of the image which is displayed during the startup process is rarely changed. Therefore, according to the first embodiment, it is possible to display an image equivalent to the target state before the optical system reaches the target state. As a result thereof, it is possible for the user not to feel uncomfortable feeling during the startup process, and to view the image.

In addition, according to the first embodiment, in the image data which is imaged by the imaging unit, the region corresponding to the field angle of the target state is trimmed and the information representing that the startup process is in progress is added, and thus, the performance image data is generated as the display image data, and therefore, it is possible for the user to easily recognize that a change in the image during the startup process occurs due to the startup process.

In addition, according to the first embodiment, the optical system driving mechanism is controlled on the basis of the information relevant to the operation control of the lens portion and the diaphragm in the startup process, and thus, it is possible to accurately and rapidly realize the startup process.

In addition, according to the first embodiment, the optical system driving mechanism drives the lens portion and the diaphragm according to the detection result of the focal point distance and the diaphragm value, and thus, for example, when the optical system is configured to be detachable from the main body portion, it is possible to realize accurate startup process even when an unexpected optical system is mounted.

In addition, according to the first embodiment, when the input unit receives selection input of the start mode, a pseudo display image (a sample) corresponding to the selected start mode is displayed on the display unit, and thus, for example, even when the user is not accustomed to the operation of the imaging device, it is possible to intuitively grasp an effective image which is obtained according to the start mode, and to simply select a preferred start mode.

Furthermore, when the operation of initializing the hand-shake correction function is also performed at the time of performing the startup process after the power source is applied, the display image data generating unit 124 may generate the display image data by adding the influence of the initialization operation of the hand-shake correction function. In the initialization operation of the hand-shake correction function, the driving unit 53 drives the moving frame 52 such that the center of the imaging region of the imaging unit 4 passes through the optical axis O of the optical system 2. When the image data which is generated by the imaging unit 4 in the middle of the startup process includes a predetermined effective image region, the display image data generating unit 124 may generate the display image data. Here, the effective image region, for example, is a region including a central image region set in advance in the image formation region of the optical system 2. The central image region, for example, is set according to an area ratio with respect to the entire image formation region. It is preferable that the central image region is set as a region including an intersection with the imaging region of the imaging element in the entire position which is capable of being taken by the imaging element. The control unit 12 may set a region coincident with the field angle in the target state described above as the effective image region. Furthermore, it is possible for the user to set the central image region through the input unit 8. In addition, the control unit 12 may set the central image region on the basis of the face of the subject to appear on the image which is imaged by the imaging unit 4 or other characteristics.

Second Embodiment

An imaging device according to a second embodiment of the present disclosure generates and displays display image data according to the state of the imaging device during the startup process by using the image data imaged in the middle of the startup process which is performed after the power source is applied. More specifically, the imaging device according to this embodiment has a function of correcting hand-shake, performs an operation of initializing the hand-shake correction function when the startup process is performed after the power source is applied, and displays at least a part of the image which is imaged in the middle of the startup process.

Figure 12:
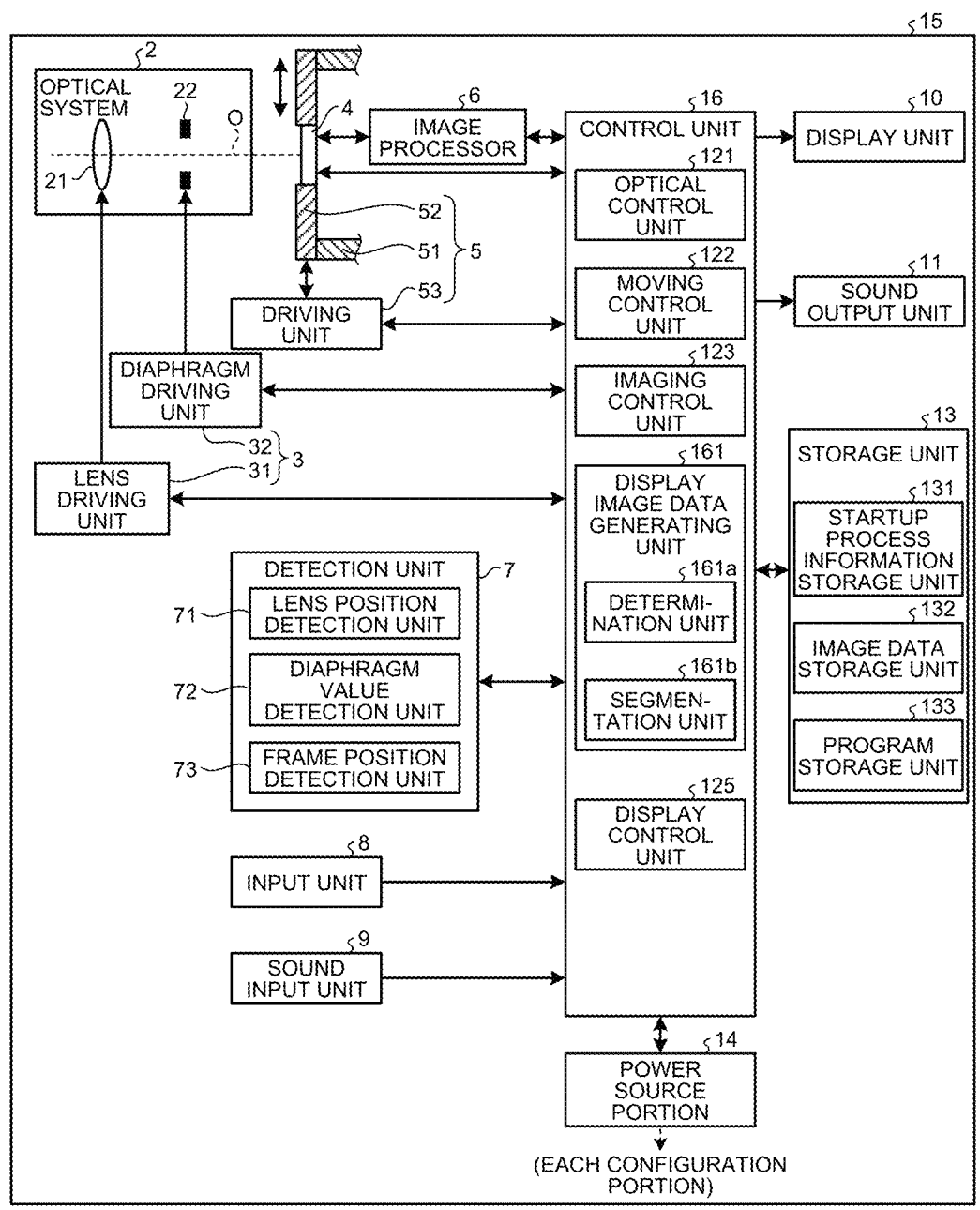
FIG. 12 is a block diagram illustrating a functional configuration of an imaging device according to a second embodiment of the present disclosure.

FIG. 12 is a block diagram illustrating a functional configuration of the imaging device according to the second embodiment of the present disclosure. An imaging device 15 illustrated in the same drawing includes the optical system 2, the optical system driving mechanism 3, the imaging unit 4, the moving mechanism 5, the image processor 6, the detection unit 7, the input unit 8, the sound input unit 9, the display unit 10, the sound output unit 11, a control unit 16, the storage unit 13, and the power source portion 14. Furthermore, same reference numerals are applied to constituents having the same functional configuration as that of the imaging device 1 described in the first embodiment.

The optical system driving mechanism 3 includes the lens driving unit 31 driving the lens portion 21 and the diaphragm driving unit 32 driving the diaphragm 22. The lens driving unit 31 moves the lens configuring the lens portion 21 along the optical axis O under the control of the control unit 16. The diaphragm driving unit 32 drives the diaphragm 22 under the control of the control unit 16, and thus, adjusts the light amount of the light which is incident on the imaging unit 4.

The driving unit 53 of the moving mechanism 5 drives and moves the moving frame 52 such that hand-shake is corrected under the control of the control unit 16.

When the power source of the imaging device 15 is turned off, the driving unit 53 moves the moving frame 52 to a position (hereinafter, referred to as an initial position) in which the optical axis O and the image center of the imaging element are shifted from each other. This position may be changed according to a state immediately before the power source is turned off, or may be the same position regardless of the state immediately before the power source is turned off. For example, when the driving unit 53 is configured of the VCM, when the power source is turned off, the VCM is in a non-excited state, and the imaging element is moved to the initial position. When the power source is applied, the driving unit 53 performs the initialization operation of the hand-shake correction function during the startup process. Here, an initialization operation of hand-shake correction processing is an operation of moving the moving frame 52 such that the optical axis O is coincident with the center of the imaging region of the imaging element, under the control of the control unit 16.

Figure 13:
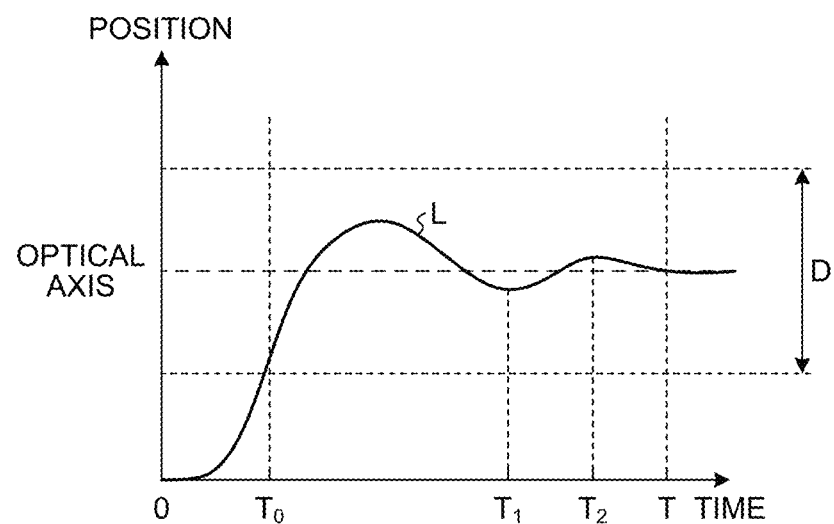
FIG. 13 is a diagram illustrating a relationship between a center position of an imaging element and time at the time of an initialization operation.

FIG. 13 is a diagram illustrating a relationship between the center position of the imaging element and time at the time of performing the initialization operation of the hand-shake correction function. A curve L illustrated in the same drawing illustrates a time change in the center position of the imaging element. A vertical axis of FIG. 13 is a position which is set according to a distance between the center position of the imaging element and the optical axis O, and the center position of the imaging element is set to 0 at time 0. In addition, a horizontal axis of FIG. 13 represents time. The time T is time where the initialization operation is completed, and is time where the center position of the imaging element is close to the center of the optical axis O and is started to be approximately coincident with the optical axis O. The value of the time T is approximately 100 msec. The times $T_0$, $T_1$, and $T_2$, and a range D illustrated in FIG. 13 will be described below.

The control unit 16 includes the optical control unit 121 controlling the operation of the optical system 2 by controlling the optical system driving mechanism 3, the moving control unit 122 controlling the operation of the moving mechanism 5, the imaging control unit 123 controlling the operation of the imaging unit 4, a display image data generating unit 161 generating the display image data to be displayed on the display unit 10 on the basis of the image data generated by the imaging unit 4, and the display control unit 125 controlling the display on the display unit 10.

When the power source of the imaging device 15 is applied, the optical control unit 121 may control the lens driving unit 31 and the diaphragm driving unit 32, and may move the lens portion 21 and the diaphragm 22 to a position of a time point where the power source is previously turned off.

The display image data generating unit 161 generates the display image data according to the state of the imaging device 15 during the startup process by using the image data which is generated by the imaging unit 4 in the middle of the startup process. The display image data generating unit 161 generates image data for display (hereinafter, referred to as display image data) including an effective image region of the image which is imaged by the imaging unit 4 in the middle of the startup process where the moving mechanism 5 moves the imaging unit 4 from the initial position to a predetermined position where the optical axis O of the optical system 2 passes through.

The display image data generating unit 161 performs the processing according to the start mode of the imaging device 15. Here, the start mode of the imaging device 15 will be described in detail. In the second embodiment, any one of a "central segmentation mode", a "live view image display mode", and a "normal mode" is capable of being set as the start mode of the imaging device 15.

The central segmentation mode is a mode in which the effective image region including the central image region set in advance in the image formation region of the optical system 2 is segmented during the initialization operation of the hand-shake correction function, and the effective image region is disposed on the central portion and is displayed on the display unit 10. Here, the central image region, for example, is set according to an area ratio with respect to the entire image formation region. It is preferable that the central image region is set as a region including an intersection with the imaging region of the imaging element in the entire position which is capable of being taken by the imaging element. Furthermore, the user may set the central image region through the input unit 8. In addition, the control unit 16 may set the central image region on the basis of the face of the subject to appear on the image which is imaged by the imaging unit 4 or other characteristics.

The live view image display mode is a mode in which a portion on which the subject appears is segmented as the effective image region from the image data generated by the imaging unit 4 during the startup process, and the effective image region is disposed by being matched with a region where the imaging element receives the image of the subject and is displayed on the display unit 10.

The normal mode is a mode in which the image imaged by the imaging unit 4 is not displayed on the display unit 10 until the startup process is completed.

The display image data generating unit 161 includes a determination unit 161a determining whether or not the segmentation of a predetermined region is capable of being performed with respect to the image which is imaged by the imaging unit 4 during the startup process when the set start mode is the central segmentation mode, and a segmentation unit 161b performing the segmentation of the effective image region including a predetermined region according to a determination result of the determination unit 161a. Here, the predetermined region is a region including at least the central image region. For example, a region which includes the central image region, has the same center as that of the central image region, and has the same aspect ratio as that of the central image region may be the predetermined region. In addition, the user may set the predetermined region through the input unit 8. In addition, the control unit 16 may set the predetermined region on the basis of the face of the subject to appear on the image which is imaged by the imaging unit 4 or other characteristics.

When it is determined whether or not the predetermined region is capable of being segmented, the determination unit 161*a* may perform determination by using coordinates, or may perform determination on the basis of the subject appearing on the image imaged by the imaging unit 4. In addition, the determination unit 161*a* may determine that the segmentation is capable of being performed when a ratio overlapping with the imaging region in the predetermined region is greater than a threshold value. The user may set the threshold value through the input unit 8.

When the set start mode is the central segmentation mode, the segmentation unit 161*b* segments the effective image region including the central image region. The range D of FIG. 13 illustrates a range of the center position of the imaging element where the imaging region of the imaging element overlaps with the central image region. In addition, time $T_0$ of FIG. 13 is time where the segmentation unit 161*b* starts the segmentation of the effective image region. The time $T_0$, for example, is approximately 10 msec to 50 msec.

Figure 14:
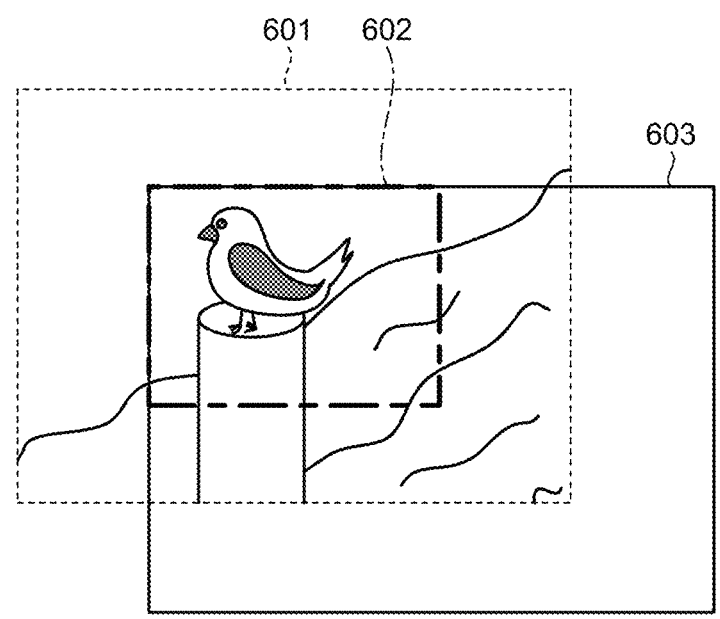
FIG. 14 is a (first) diagram schematically illustrating an outline of segmentation processing which is performed by a segmentation unit of the imaging device according to the second embodiment of the present disclosure.
Figure 15:
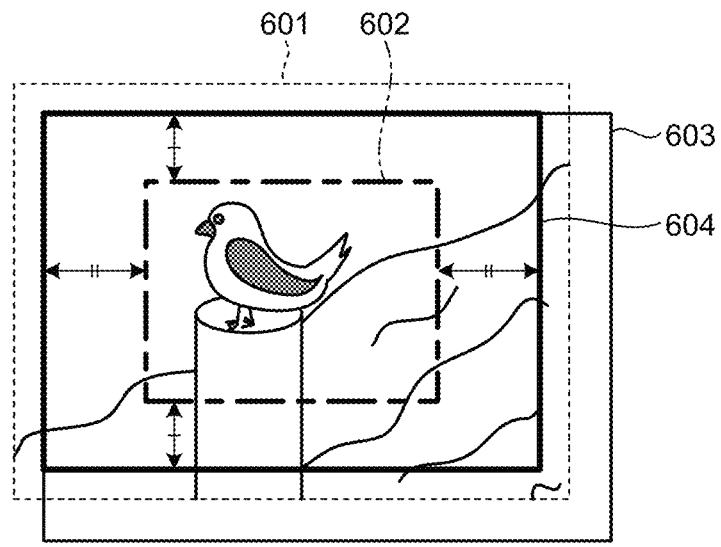
FIG. 15 is a (second) diagram schematically illustrating the outline of the segmentation processing which is performed by the segmentation unit of the imaging device according to the second embodiment of the present disclosure.

The size of the effective image region segmented by the segmentation unit 161*b* is changed along with the movement of the imaging unit 4. FIGS. 14 and 15 are diagrams schematically illustrating the outline of the segmentation processing which is performed by the segmentation unit 161*b* in the case of being set to the central segmentation mode, and are diagrams respectively illustrating the outline of the segmentation processing at times $T_1$ and $T_2$ illustrated in FIG. 13. In FIG. 14, a region 601 illustrated by a broken line represents the image formation region of the optical system 2 (hereinafter, referred to as an image formation region 601). In addition, a region 602 illustrated by a dashed-dotted line represents the central image region (hereinafter, referred to as a central image region 602). In addition, a region 603 illustrated by the solid line represents the imaging region of the imaging element (hereinafter, referred to as an imaging region 603). As obvious from FIG. 13, in a state illustrated in FIG. 15, the center of the imaging region 603 is closer to the center of the optical axis O, and an area where the image formation region 601 overlaps with the imaging region 603 is large, compared to a state illustrated in FIG. 14. The effective image region of FIG. 14 is the central image region 602. In contrast, an effective image region 604 of FIG. 15 is a region in which the central image region 602 is positioned on the central portion in the portion where the image formation region 601 overlaps with the imaging region 603, and which is segmented at the same aspect ratio as that of the central image region 602.

Here, a case will be described in which the effective image region 604 is segmented in a circumstance where the imaging region 603 surrounds the central image region 602 from all directions, and for example, in a case illustrated in FIG. 14, the segmentation unit 161*b* is capable of segmenting the portion where the image formation region 601 overlaps with the imaging region 603 as the effective image region. In addition, as illustrated in FIG. 15, when the central image region 602 does not include the boundary of the imaging region 603, only the central image region 602 is capable of being segmented as the effective image region. Further, in a case illustrated in FIG. 15, the segmentation unit 161*b* may segment a region surrounding the central image region 602 as the effective image region at a distance from an outer circumference of the central image region 602 to an outer perimeter of the closest imaging region 603.

Figure 16:
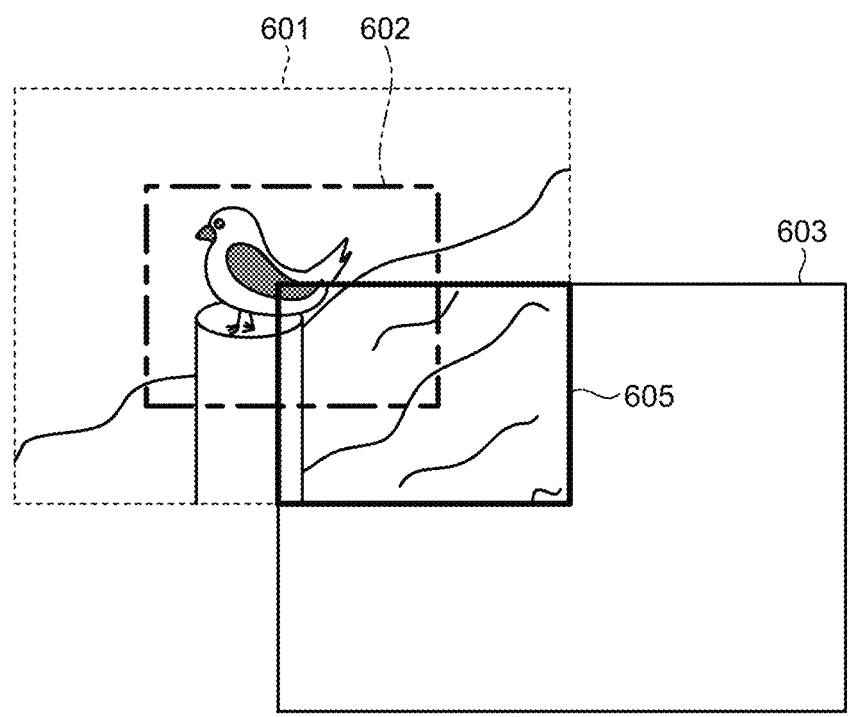
FIG. 16 is a diagram illustrating segmentation of an effective image region in a live view image display mode.

FIG. 16 is a diagram schematically illustrating the outline of the segmentation processing which is performed by the segmentation unit 161*b* when the set start mode is the live view image display mode. In this case, the segmentation unit 161*b* segments the portion where the image formation region 601 overlaps with the imaging region 603 as an effective image region 605. The effective image region 605 does not include the entire central image region 602, and thus, the segmentation is capable of being performed only when the start mode is set to the live view image display mode. When the start mode is set to the central segmentation mode, a circumstance illustrated in FIG. 16 is a circumstance where the determination unit 161*a* determines that the segmentation is not capable of being performed. Furthermore, in the live view image display mode, the segmentation unit 161*b* may segment only the portion where the central image region 602 overlaps with the imaging region 603. Accordingly, when the user performs targeting with respect to the subject, it is possible to segment and output only a more effective region.

Figure 17:
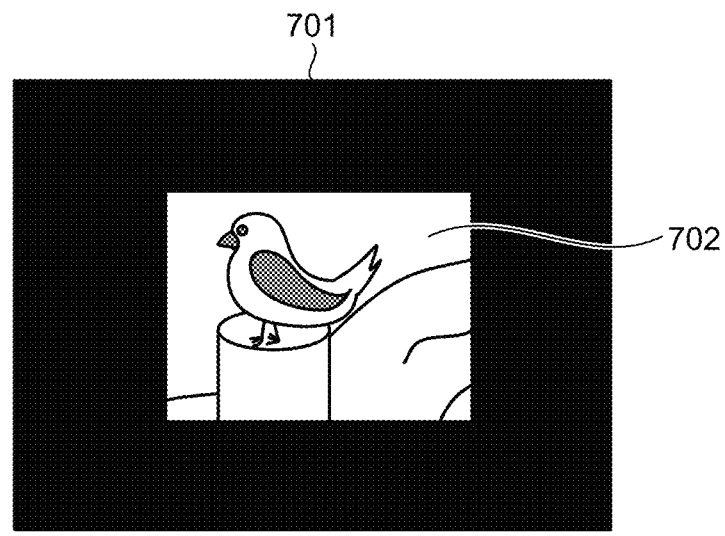
FIG. 17 is a diagram illustrating a display example of a display image in the display unit, which is segmented and generated by using a central image region illustrated in FIG. 14 as the effective image region.
Figure 18:
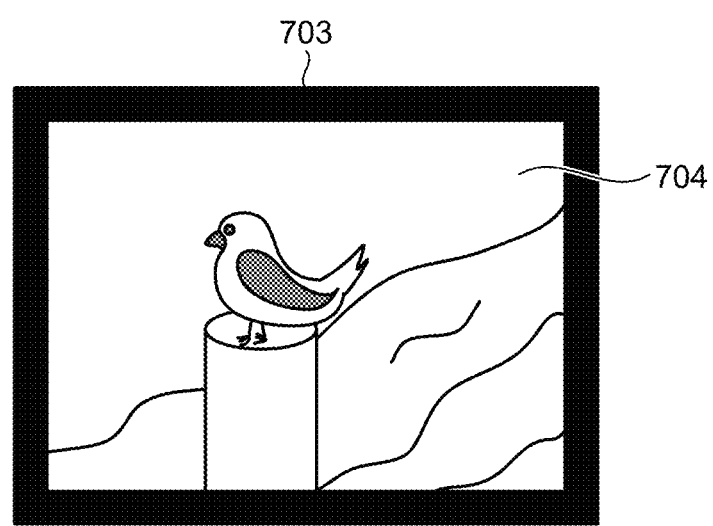
FIG. 18 is a diagram illustrating a display example of a display image in the display unit, which is generated by segmenting the effective image region illustrated in FIG. 15 and by disposing the effective image region in the center.

FIGS. 17 and 18 are diagrams illustrating display examples of the display image in the display unit 10, corresponding to the display image data which is generated by the display image data generating unit 161 when the set start mode is the central segmentation mode. A display image 701 illustrated in FIG. 17 is a display example when the segmentation unit 161*b* segments the central image region 602 illustrated in FIG. 14 as the effective image region and disposes the central image region 602 on the center. Therefore, a subject image 702 displayed by the display image 701 is the same image as the image of the central image region 602, and has the same size as that of the image on the display screen of the display unit 10. In addition, a display image 703 illustrated in FIG. 18 is a display example when the segmentation unit 161*b* segments the effective image region 604 illustrated in FIG. 15 and disposes the effective image region 604 on the center. Therefore, a subject image 704 displayed by the display image 703 is the same image as the image of the effective image region 604, and has the same size as that of the image on the display screen of the display unit 10.

Furthermore, a display image where the image segmented by the segmentation unit 161*b* is disposed in a position identical to the original position may be displayed on the display unit 10. Specifically, for example, when the segmentation unit 161*b* segments the effective image region 604 illustrated in FIG. 15, the effective image region 604 may be displayed by being disposed in an upper left portion on the display screen of the display unit 10.

Figure 19:
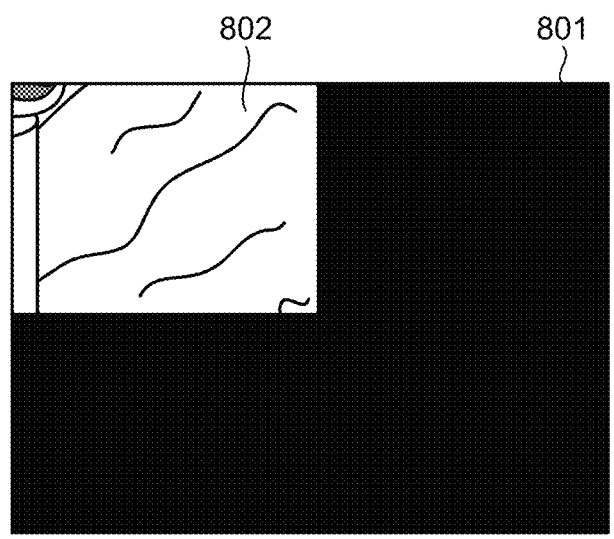
FIG. 19 is a diagram illustrating a display example of the display image in the display unit, which is generated by segmenting the effective image region illustrated in FIG. 16.

FIG. 19 is a diagram illustrating a display example of the display image in the display unit 10, corresponding to the display image data which is generated by the display image data generating unit 161 when the set start mode is the live view image display mode. A display image 801 illustrated in the same drawing is an image in which the position of a subject image 802 is disposed in the upper left portion on the screen, as with the position of the effective image region 605 in the imaging region 603 (refer to FIG. 16). Furthermore, in a case illustrated in FIG. 16, when the segmentation unit 161*b* segments only the portion where the central image region 602 overlaps with the imaging region 603 as the effective image region, it is obvious that the size of the subject image on the display screen of the display unit 10 is smaller than the size of the subject image 802 illustrated in FIG. 19.

When the set start mode is the central segmentation mode or the live view image display mode, the optical control unit 121 performs photometry by using the image which is segmented by the segmentation unit 161b, and thus, performs AE processing. Accordingly, it is possible to perform the AE processing without using a portion which is not imaged. In addition, it is possible to perform the AE processing at an earlier timing from the power source is turned on (for example, approximately 10 msec to 50 msec after the power source is applied). Furthermore, when the start mode is set to the live view image display mode, the optical control unit 121 may perform the AE processing by using only a pixel of the central image region included in the segmented image.

The display control unit 125 allows the display image corresponding to the display image data which is generated by the display image data generating unit 161 in the middle of the startup process to be displayed on the display unit 10.

The control unit 16 having the functional configuration described above is configured of a dedicated integrated circuit executing a specific function, such as a general-purpose processor of a CPU or the like, or an ASIC or a FPGA.

Here, the imaging device 15 has been described as being integrated, but is not limited thereto, and as with the first embodiment, for example, the same function as that of the imaging device 15 may be realized by connecting a lens type camera to be communicated with an information terminal such as a smart phone in a wireless manner, or the same function as that of the imaging device 15 may be realized by a camera built in a personal computer, a monitoring camera, a wearable terminal, a portable terminal, and the like.

Figure 20:
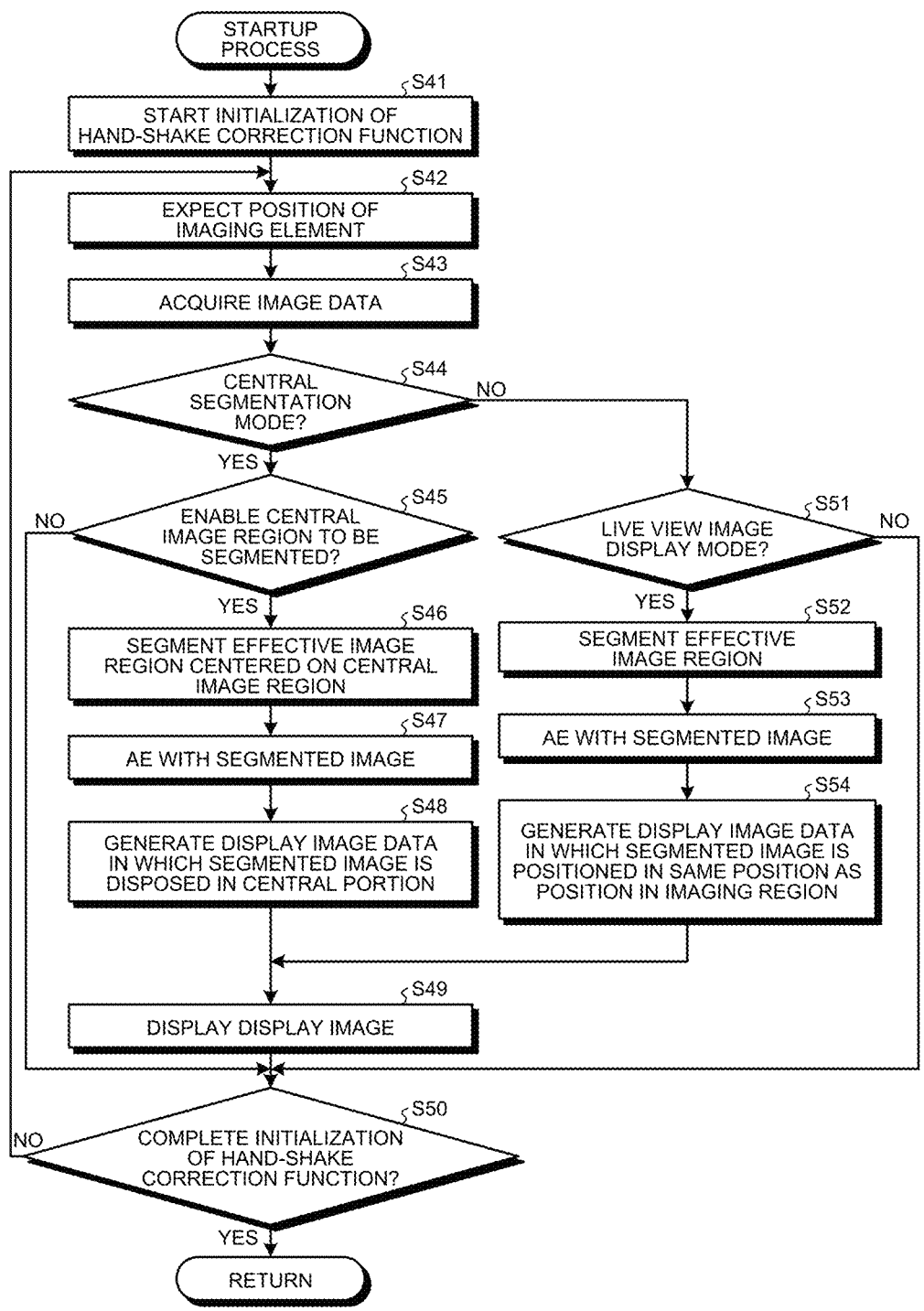
FIG. 20 is a flowchart illustrating the outline of the startup process.

The imaging device 15 having the functional configuration described above performs the processing according to the flowchart of FIG. 8 described in the first embodiment. Hereinafter, a portion will be described in which the processing contents are different from those of the first embodiment. First, the outline of the startup process of Step S2 will be described with reference to a flowchart illustrated in FIG. 20. First, the control unit 16 starts the initialization of the hand-shake correction function (Step S41). Specifically, the driving unit 53 moves the moving frame 52 from the initial position when the power source is turned off, and starts the operation in which the image center position of the imaging element of the imaging unit 4 is coincident with the optical axis O.

After that, the control unit 16 expects the position of the imaging element (Step S42). The position of the imaging element, for example, may be expected on the basis of the information of an actuator of the driving unit 53, or may be expected from time after the operation of the moving frame 52 is started. In the second embodiment, the initial position when the power source is turned off is stored in the storage unit 13. The initial position may be a position set in advance, or may be a position which is different whenever the power source is turned off. In the latter, the position of the imaging element is written and stored in the storage unit 13 according to the end processing when the power source is turned off.

Subsequently, the control unit 16 acquires the image data which is generated by the imaging unit 4 and is subjected to the processing of the image processor 6, under the control of the imaging control unit 123 in the middle of the startup process (Step S43).

After that, the control unit 16 determines whether or not the set start mode is the central segmentation mode (Step S44). When the set start mode is the central segmentation mode (Step S44: Yes), the determination unit 161a determines whether or not the segmentation of the predetermined central image region is capable of being performed with respect to the acquired image data (Step S45). When the determination unit 161a determines that the segmentation of the central image region is capable of being performed (Step S45: Yes), the segmentation unit 161b segments the effective image region centered on the central image region from the image data (Step S46). For example, in a case illustrated in FIG. 14, the central image region 602 is segmented as the effective image region. In addition, in a case illustrated in FIG. 15, the central image region 602 is positioned in the central portion, and the effective image region 604 having the same aspect ratio as that of the central image region 602 is segmented.

After Step S46, the optical control unit 121 performs photometry on the basis of the image of the segmented effective image region, and controls the diaphragm driving unit 32, and thus, executes the AE processing in which the diaphragm 22 is driven such that proper exposure is performed (Step S47). Thus, the AE processing using only a portion displayed on the display unit 10 is performed, and thus, it is possible to control the brightness of a portion which is required for display on the display unit 10.

Subsequently, the display image data generating unit 161 generates display image data in which the image segmented by the segmentation unit 161b is disposed in the central portion (Step S48).

After that, the display unit 10 displays the display image under the control of the display control unit 125 (Step S49). At this time, the display image to be displayed, for example, is the display image 701 illustrated in FIG. 17 or the display image 703 illustrated in FIG. 18. The size of the subject image in the display image is changed according to the distance between the center of the imaging element and the optical axis O. For example, when the imaging element exhibits the behavior illustrated in FIG. 13, the size of the subject image gradually increases as a magnitude change is repeated.

After that, when the initialization of the hand-shake correction function is completed (Step S50: Yes), the imaging device 15 ends the startup process. In contrast, when the initialization of the hand-shake correction function is not completed (Step S50: No), the imaging device 15 is returned to Step S42.

Figure 21:
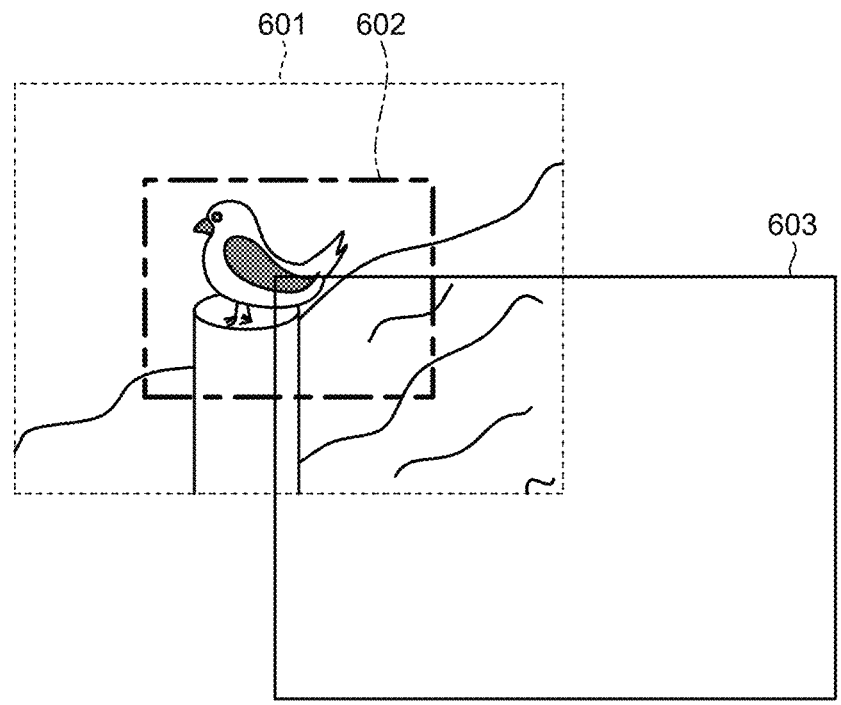
FIG. 21 is a diagram schematically illustrating a positional relationship between a central image region and the imaging element when the central image region is not capable of being segmented.

In Step S45, a case will be described in which the determination unit 161a determines that the segmentation of the central image region is not capable of being performed with respect to the image data (Step S45: No). FIG. 21 is a diagram schematically illustrating a positional relationship between the central image region and the imaging element when the segmentation of the central image region is not capable of being performed. In a case illustrated in FIG. 21, the imaging region 603 includes an overlap only with a part of the central image region 602. In this case, the imaging device 15 proceeds to Step S50. That is, the display control unit 125 does not perform particular processing, and the display unit 10 does not perform display.

Next, in Step S44, a case will be described in which it is determined that the set start mode is not the central segmentation mode (Step S44: No). In this case, when the set start mode is the live view image display mode (Step S51: Yes), the segmentation unit 161b segments the overlap portion between the image formation region and the imaging region as the effective image region (Step S52). For example, in the case of the central segmentation mode, the segmentation unit 161b performs the segmentation (refer to FIG. 16) even when the determination unit 161a determines that the segmentation is not capable of being performed (refer to FIG. 21).

Subsequently, the optical control unit 121 performs photometry on the basis of the image of the segmented effective image region, and controls the diaphragm of the optical system 2, and thus, executes the AE processing such that proper exposure is performed (Step S53). Furthermore, in this case, the optical control unit 121 may perform the AE processing by using only the central image region included in the effective image region.

After that, the display image data generating unit 161 generates the display image data in which the image segmented by the segmentation unit 161b is positioned in the same position as the position in the imaging region (Step S54). After Step S54, the imaging device 15 proceeds to the display processing of the display image in Step S49. In this case, the display image displayed on the display unit 10, for example, is the display image 801 illustrated in FIG. 19. For example, when the imaging element exhibits the behavior illustrated in FIG. 13, the size of the subject image gradually increases as a magnitude change is repeated.

In Step S51, when the set start mode is not the live view image display mode (Step S51: No), the start mode is the normal mode, and thus, the imaging device 15 proceeds to Step S50.

Furthermore, in Step S49, when the release switch of the input unit 8 receives the input of the start instruction signal of the capturing in the middle of displaying the display image on the display unit 10, the imaging device 15 may perform the still image capturing. Accordingly, it is possible for the user to acquire a desired image even during the startup process.

Figure 22:
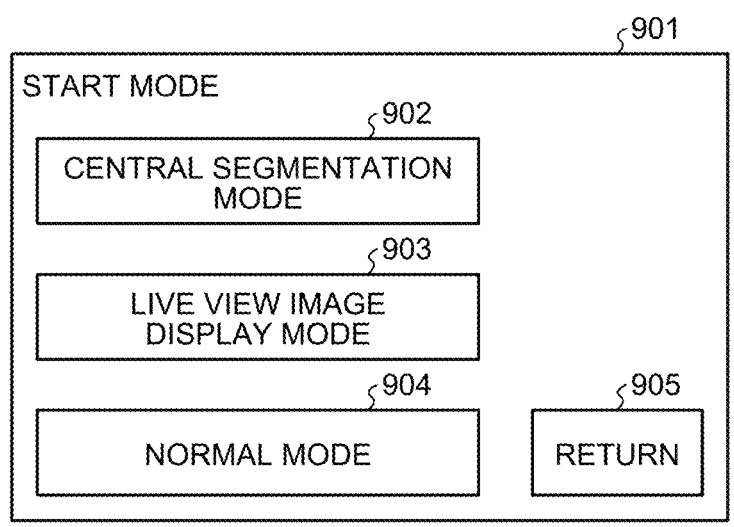
FIG. 22 is a diagram illustrating a display example of the start mode selection screen in the display unit.

Next, an display example of the start mode selection screen in the display unit 10 when the region of the start mode icon 402 is touched when the display unit 10 displays the setting screen 401 (refer to FIG. 10) for urging the user to perform the setting input in the setting change processing of the start mode in Step S7, will be described with reference to FIG. 22. A start mode selection screen 901 illustrated in FIG. 22, includes a return icon 905 for being returned to the setting screen 401 illustrated in FIG. 10, in addition to a central segmentation mode icon 902 for selecting the central segmentation mode, a live view image display mode icon 903 for selecting the live view image display mode, and a normal mode icon 904 for selecting the normal mode. When the user touches an icon corresponding to a desired mode, the touch panel receives the input of the mode selection signal according to the touch position. The control unit 16 changes the setting of the start mode on the basis of the input setting instruction signal.

Furthermore, when any one of mode selection icons is touched on the start mode selection screen 901, and the input of the corresponding mode selection signal is received, transition to a screen displaying a sample of the display image corresponding to the selected start mode may be performed. In this case, a determination icon for determining the selection of the start mode and a return icon to being returned to the start mode selection screen 901 are displayed on the display unit 10 along with the sample image. Thus, the display unit 10 displays the display sample, and thus, the user is capable of confirming a display aspect of the start mode by observing the sample image, and therefore, even when the user is not accustomed to the operation of the imaging device 15, it is possible to intuitively grasp the start mode, and to simply select a preferred start mode.

Next, the end processing of Step S12 will be described. When the processing of the imaging device 15 is ended, the control unit 16 performs processing of storing the state of the optical system 2 in the storage unit 13, processing of returning the optical system 2 to a predetermined initial state, control of allowing the driving unit 53 to move the imaging element to the initial position, and the like.

According to the second embodiment of the present disclosure described above, the imaging control unit allowing the imaging unit to be operated in the middle of the startup process performed after the power source is applied, the display image data generating unit generating the display image data according to the state of the imaging device by using the image data generated in the middle of the startup process, and the display control unit allowing the image corresponding to the display image data generated by the display image data generating unit to be displayed on the display unit in the middle of the startup process are provided, and thus, it is possible to swiftly display the image which is imaged after the power source is applied.

In addition, according to the second embodiment, in the startup process, when the moving mechanism moves at least any one of the optical system and the imaging unit from the initial position to the predetermined position, the display image data including the predetermined effective image region in the image data generated by the imaging unit is generated, and thus, it is possible to display the image until the startup process is ended.

In addition, according to the second embodiment, the effective image region including the central image region which is set in advance with respect to the image formation region of the optical system from the image imaged by the imaging unit is segmented, and the effective image region is disposed on the central portion of the image, and thus, the display image data is generated, and therefore, it is possible for the user to determine that it is during the startup process according to the size of the image. Such an effect is an effect which is also capable of being obtained when the display image data is generated by using the region obtained from the image of the subject in the image data generated by the imaging unit as the effective image region.

In addition, according to the second embodiment, the exposure control is performed on the basis of the image data of the effective image region, and thus, it is possible to perform imaging with a suitable brightness even during the startup process.

In addition, according to the second embodiment, when the input unit receives the selection input of the start mode, the pseudo display image (the sample) corresponding to the selected start mode is displayed on the display unit, and thus, even when the user is not accustomed to the operation of the imaging device, it is possible to intuitively grasp the display image obtained according to the start mode, and to simply select a preferred start mode.

Furthermore, in the case of performing the operation in which the optical system 2 reaches to a target state when the startup process is performed after the power source is applied, the display image data generating unit 161 may generate the display image data by also adding the operation of the optical system 2. In this case, the optical control unit 121 controls the lens driving unit 31 and the diaphragm driving unit 32, and drives the lens portion 21 and the diaphragm 22, and thus, changes each of the focal point distance and the diaphragm value from the initial value to the target value. Here, the target value is the focal point distance and the diaphragm value when the power source of the imaging device 15 is previously turned off. When the display image data is generated, the display image data generating unit 161 may adjust the size and the brightness of the image to be close to the target value of the focal point distance and the diaphragm value.

Other Embodiments

Here, an aspect for carrying out the present disclosure has been described, but the present disclosure is not limited to the embodiment described above. When the power source of the imaging device is applied, it is necessary to rapidly start a necessary function (a priority function), and it is difficult to perform control before the power source is applied, and thus, an item (an auxiliary function) which is capable of being controlled at the first time by applying the power source is delayed, or is simultaneously processed. Herein, a function of viewing, capturing, and observing a target image is described as the priority function, and the control of the optical system is described as the auxiliary function. In addition, herein, processing of starting the auxiliary function is described as the startup process. A relationship between the priority function and the auxiliary function may be reversed, and for example, herein, control or the like involving a mechanical displacement including an optical system such as zoom or focus imaging, is described as the auxiliary function by considering that it takes time compared to electrical control such as imaging or display. When the imaging is capable of being performed, it is possible to switch the start mode according to a circumstance. Thus, the function of the sensor system is described as the priority function because it is possible to assist the user according to the circumstance, and thus, it is possible to regard the function as effective control.

Furthermore, a plurality of auxiliary functions may be provided. In the plurality of auxiliary functions, parallel processing may be performed according to supply energy of the power source or the contents of the processing. Accordingly, it is possible to rapidly end the processing. In addition, when time required for the processing is within a predetermined allowed time, the plurality of auxiliary functions may be serially and sequentially processed. In addition, division control may be performed in which start times of the plurality of auxiliary functions are shifted and are gradually executed. Further, a priority order when the plurality of auxiliary functions are executed may be switched according to a circumstance or operation input at the time of performing capturing. In addition, the division control may be performed with respect to the plurality of auxiliary functions by being divided into coarse adjustment and fine adjustment according to the processing contents. When there is no problem when only the coarse adjustment is executed, the control may proceed to the next control such as the capturing or the image processing in a state where only the coarse adjustment is executed. For example, when the focus is greatly blurred, it is considered that control (the coarse adjustment) of quickly solving the blur is preferentially performed, initial positioning for vibration-proof control or the like is performed with a certain degree of accuracy (the coarse adjustment), and then, the observation or the capturing is performed. When the focus is greatly blurred, the user does not notice that shift adjustment or the like is performed by the positioning for vibration-proof control. When a portion having low contrast is monitored in the imaging device, the user does not notice the blur or the shift, and thus, the priority function and the auxiliary function may be switched according to a capturing circumstance.

In addition, when the imaging and the display are performed during the startup process, a disturbance in the acquired image may be restored by the image processing.

In addition, when the start time of the imaging device is time where a substantial problem does not occur in information acquisition based on the original function such as quick observation or capturing of the target, when the imaging device is started, the imaging device may display a text, an icon, or the like where the imaging contents are described, instead of displaying the imaging result. Accordingly, it is possible for the user to notice that the imaging device is smoothly started, and for the user to feel a sense of safety.

Herein, in the description of the flowchart, an anteroposterior relationship of the processing between the steps is described by using expression such as "first", "after that", and "subsequently", but the order of the processing required for carrying out the embodiment described above is not uniquely set by the expression. That is, in the flowchart described herein, the order of the processing is capable of being changed within a consistent range.

In addition, herein, the algorithm of the processing described by using the flowchart is capable of being described as a program. Such a program may be stored in a storage unit in a computer, or may be recorded in a computer readable recording medium. The storage of the program in the storage unit or the record of program in the recording medium may be performed when the computer or the recording medium is shipped as a product, or may be performed by being downloaded through a communication network.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device that starts power supply to an imaging unit and a display unit in response to input of a power source, and performs startup process for transitioning to a capturable state, the imaging device comprising:
   an imaging control unit configured to enable the imaging unit to operate after a first predetermined time from the starting of the power supply to the imaging unit;
   a display control unit configured to control the display unit to display image data generated by the imaging unit after a second predetermined time from the starting of the power supply to the display unit, the second predetermined time being longer than the first predetermined time; and
   a display image data generating unit configured to generate display image data from when the display unit is ready to display the image data to when the transition to the capturable state completes,
   wherein the imaging unit captures a light flux and converts the light flux to the image data, the light flux passing through an optical system in a state in which a lens in the optical system has not reached a predetermined target state before completion of an initializing operation from when the display unit is ready to display the image data to when the transition to the capturable state completes during the startup process, and
   the display image data generating unit generates the display image data by sequentially reducing or magnifying, based on a current focal point distance in the optical system before the completion of the initializing operation, an image relating to the converted image data.

2. The imaging device according to claim 1,
wherein the capturable state is:
an imaging standby state in which an optical system or a diaphragm is set in a predetermined position and capturing is capable of being performed in response to a release signal; or
a storage position state in which the optical system or the diaphragm is set in a position when the power source of the imaging device is turned off and capturing is capable of being performed in response to a release signal.

3. The imaging device according to claim 1, further comprising:
a voice coil motor (VCM) moving mechanism including a magnet and a coil and configured to move a movable portion, in which an imaging element is disposed, with respect to a fixed portion by a magnetic force; and
a VCM moving control unit configured to control the movable portion to operate after a third predetermined time from starting of power supply to the coil of the VCM moving mechanism in response to the input of the power source,
wherein the capturable state is a state in which the movable portion is moved with respect to an image formation region when the imaging element disposed in the movable portion is positioned in a basic position such that a region of a part of an imaging region including an optical axis center of the imaging element is in a state of being included in the image formation region, and
the display image data generating unit generates the region of the part of the imaging region including the optical axis center of the imaging element as the image data.

4. The imaging device according to claim 1, further comprising:
a voice coil motor (VCM) moving mechanism including a magnet and a coil and configured to move a movable portion, in which a lens is disposed, with respect to a fixed portion by a magnetic force; and
a VCM moving control unit configured to control the movable portion to operate after a third predetermined time from stating of power supply to the coil of the VCM moving mechanism in response to the input of the power source,
wherein the capturable state is a state in which the movable portion is moved with respect to an image formation region on an imaging element when the lens disposed in the movable portion is positioned in a basic position such that the lens is positioned in a position different from the basic position and a region of a part of an imaging region including an optical axis center of the imaging element at this time is in a state of being included in the image formation region, and
the display image data generating unit generates the region of the part of the imaging region including the optical axis center of the imaging element as the image data.

5. The imaging device according to claim 1,
wherein the display image data generating unit includes a processed image data generating unit configured to generate processed image data based on a focal point distance value and a diaphragm value of a display state in which display is capable of being performed by the display control unit, when the image is displayed on the display unit with being sequentially magnified or reduced.

6. The imaging device according to claim 5,
wherein the display image data generating unit includes a performance image data generating unit configured to generate performance image data representing that the startup process is in progress, and
the display control unit controls the display unit to display the generated performance image data on an image region other than a region corresponding to the image data.

7. The imaging device according to claim 1, further comprising:
a storage unit configured to store start modes which are set after the startup process when the power source is turned on; and
an input unit configured to receive input of a selection of a start mode selected from the start modes stored in the storage unit,
wherein the display control unit controls the display unit to display the start modes stored in the storage unit on the display unit, and controls the display unit to display a pseudo image corresponding to the selected start mode when the input unit receives the selection of the start mode.

8. A startup method of an imaging device which starts power supply to an imaging unit and a display unit in response to input of a power source, and performs startup process for transition to a capturable state, the method comprising:
enabling the imaging unit to operate after first predetermined time from the starting of the power supply to the imaging unit;
converting a light flux to the image data by the imaging unit, the light flux passing through an optical system in a state in which a lens in the optical system has not reached a predetermined target state before completion of an initializing operation from when the display unit is ready to display the image data to when the transition to the capturable state completes during the startup process;
controlling the display unit to display the image data generated by the imaging unit after second predetermined time from the starting of the power supply to the display unit, the second predetermined time being longer than the first predetermined time;
generating display image data by sequentially reducing or magnifying, based on a current focal point distance in the optical system before the completion of the initializing operation, an image relating to the converted image data until the transition to a capturable state completes; and
controlling the display unit to display the generated display image from when the display unit is ready to display the image data to when the transition to the capturable state completes during the startup process.

9. A non-transitory computer-readable recording medium with an executable program stored thereon, the program causing a processor to execute:
enabling an imaging unit to operate after first predetermined time from starting of power supply to the imaging unit;
converting a light flux to the image data by the imaging unit, the light flux passing through an optical system in a state in which a lens in the optical system has not reached a predetermined target state before completion of an initializing operation from when the display unit is ready to display the image data to when the transition to the capturable state completes during the startup process;

controlling the display unit to display the image data generated by the imaging unit after second predetermined time from the starting of the power supply to the display unit, the second predetermined time being longer than the first predetermined time;

generating display image data by sequentially reducing or magnifying, based on a current focal point distance in the optical system before the completion of the initializing operation, an image relating to the converted image data until the transition to a capturable state completes; and controlling the display unit to display the generated display image from when the display unit is ready to display the image data to when the transition to the capturable state completes during the startup process.

* * * * *